(12) United States Patent
Utsunomiya

(10) Patent No.: US 6,603,223 B2
(45) Date of Patent: Aug. 5, 2003

(54) ELECTRONIC APPARATUS HAVING DUAL-MODE LOAD CIRCUIT

(75) Inventor: Fumiyasu Utsunomiya, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/863,843

(22) Filed: May 23, 2001

(65) Prior Publication Data

US 2002/0030473 A1 Mar. 14, 2002

(30) Foreign Application Priority Data

May 23, 2001 (JP) ......................................... 2001-154324

(51) Int. Cl.[7] ................................................. H04B 1/16
(52) U.S. Cl. ........................................ 307/154; 455/343
(58) Field of Search .............................. 702/60, 63, 64, 702/FOR 106; 307/154; 713/310, 323; 324/415, 416, 103 R; 455/127, 117, 343, 89, FOR 121; 323/283, 284

(56) References Cited

U.S. PATENT DOCUMENTS

| | | | | |
|---|---|---|---|---|
| 5,930,516 A | * | 7/1999 | Watts et al. ................. | 323/225 |
| 6,160,490 A | * | 12/2000 | Pace et al. ................... | 713/300 |
| 6,201,977 B1 | * | 3/2001 | Cathey et al. ............... | 455/343 |
| 6,236,674 B1 | * | 5/2001 | Morelli et al. .............. | 375/219 |
| 6,243,821 B1 | * | 6/2001 | Reneris ....................... | 713/323 |

* cited by examiner

*Primary Examiner*—Shawn Riley
(74) *Attorney, Agent, or Firm*—Adams & Wilks

(57) ABSTRACT

An electronic apparatus for stably driving a load circuit having operating modes that are vastly different in consumed electric current values and current variations. A supply device supplies a first power. A voltage converting circuit produces a converted power by converting the first power. A control circuit outputs a control signal for controlling the voltage converting circuit and outputting a fourth power based on the converted power. The load circuit is driven by the fourth power and has first and second operating modes and outputs an operating mode signal to the control circuit indicating in which mode it is being operated. The control circuit has first and second output voltage control modes and selects in which of the first and second output voltage control modes an output voltage of the voltage converting circuit is controlled by the operating mode signal.

19 Claims, 12 Drawing Sheets

ELECTRONIC APPARATUS HAVING DUAL-MODE LOAD CIRCUIT

BACKGROUND OF THE INVENTION

The present invention relates to an electronic apparatus having a voltage converting circuit for converting the voltage of power supplied by an electricity supply device and operated by power outputted from this voltage converting circuit.

FIG. 12 typically shows the schematic construction of a conventional electronic apparatus. As shown in FIG. 12, the conventional electronic apparatus is constructed by a voltage converting circuit 702, a control circuit 105 and a load circuit 104. The voltage converting circuit 702 outputs fourth power 109 by converting the voltage of first power 106 supplied from an electricity supply device 101. The control circuit 105 detects the voltage of second power and outputs a control signal 710 to control an operation of the voltage converting circuit 702 such that the fourth power 109 has a predetermined desirable voltage. The load circuit 104 is operated by the fourth power 109.

In the conventional electronic apparatus having the above construction, the control circuit 105 must be operated in an output voltage control mode having a large consumed electric current but a high control speed at any time so as to follow a variation of a consumed electric current of the load circuit 104. Therefore, when there is a period in which there is almost no variation of the consumed electric current in the load circuit 104, the control circuit 105 is operated in the output voltage control mode although no high control speed is required. Therefore, in this case, a problem exists in that the conversion from the first power 106 to the fourth power greatly becomes worse, and no first power 106 from the electricity supply device 101 can be effectively utilized to operate the load circuit 104.

Further, the voltage converting circuit 702 is limited in a power range able to efficiently output the fourth power 109 from the first power 106. Therefore, in the case of a circuit in which consumed power of the load circuit 104 is extremely changed, there is a case in which power outside the power range able to efficiently output power by the voltage converting circuit 702 is supplied to the load circuit 104. In this case, a problem exists in that no first power 106 from the electricity supply device 101 can be effectively utilized to operate the load circuit 104.

Such a problem is caused particularly when the load circuit 104 is an IC having an operating mode having a large consumed electric current and a violent variation of the consumed electric current, and a standby mode having a small consumed electric current and a small variation of the consumed electric current, and is an IC for a portable telephone having a receiving-transmitting mode having a large consumed electric current and a violent variation of the consumed electric current, and a waiting mode having a small consumed electric current and a small variation of the consumed electric current. The number of cases adopting the IC of such a type in the load circuit 104 is recently increased, and the number of cases causing the above problem is increased in recent years.

The above problem becomes particularly serious in a compact portable apparatus having the same construction as the conventional electronic apparatus of the construction shown in FIG. 12. This is because a battery or a secondary battery as the electricity supply device is made compact and is reduced in capacity as the portable apparatus is made compact and light in weight, but the load circuit consumes high power to raise functions and is difficult to perform an operation for a long time and cannot be further operated for a long time when the above problem is caused.

Further, in a recent compact portable apparatus, it is necessary to make the secondary battery as the electricity supply device compact and light in weight and increase capacity of the secondary battery so as to make the portable apparatus compact and light in weight and raise performance of the portable apparatus and operate the portable apparatus for a long time. Therefore, the type of a high battery voltage tends to be adopted in the secondary battery. In contrast to this, the load circuit of the compact portable apparatus tends to adopt an IC constructed by a MOSFET of a fine structure at the sacrifice of a withstand voltage with respect to the voltage of the load circuit, and a MOSFET having a fine and SOI structure at the sacrifice of a withstand voltage with respect to the voltage of the load circuit so as to reconcile high performance and low consumed power. Therefore, in a recent compact portable apparatus, no load circuit can be directly operated by power of the battery or the secondary battery. Accordingly, similar to the construction of the conventional electronic apparatus shown in FIG. 12, the compact portable apparatus increasingly has a construction in which the power of a high voltage of the secondary battery is converted to power of a low voltage by the voltage converting circuit, and the load circuit is operated by this converted power of a low voltage. Accordingly, the above problem becomes serious in the recent compact portable apparatus.

Further, in the recent compact portable apparatus, the load circuit also tends to adopt an IC having a large difference in the consumed electric current and the consumed electric current variation such as the operating mode and the standby mode, or the receiving-transmitting mode and the waiting mode, etc. to improve performance and reduce power consumption. Therefore, the above problem becomes more serious.

SUMMARY OF THE INVENTION

Therefore, a main object of the present invention is to provide an electronic apparatus in which a load circuit having an operating mode extremely different in a consumed electric current and a consumed electric current variation can be efficiently operated by converted power from the electricity supply device.

In a first construction of an electronic apparatus in the invention, the electronic apparatus comprises electricity supply device for supplying power; a voltage converting circuit for converting the power to converted power different in voltage from the power and outputting the converted power; a control circuit for controlling an operation of the voltage converting circuit such that the converted power becomes predetermined desirable power; and a load circuit operated by the converted power; wherein the control circuit has a first output voltage control mode and a second output voltage control mode having a consumed electric current smaller than that in the first output voltage control mode; the load circuit has a first operating mode and a second operating mode having a variation of the consumed electric current smaller than that in the first operating mode; and the electronic apparatus has a period for operating the control circuit in the second output voltage control mode when the load circuit is set to the second operating mode. In accordance with such a construction, it is possible to solve a reduction in utilization efficiency of the power of the electricity supply device 101 with respect to the load circuit 104 as a problem in a period in which no consumed electric current of the load circuit 104 is almost varied.

Further, the load circuit outputs an operating mode signal for notifying in which of the first and second operating modes the loading circuit is operated. In accordance with such a construction, in addition to the effects of the above construction, the operating mode of the load circuit can be reliably known so that control can be more reliably performed and power can be stably supplied to the load circuit.

Further, the electronic apparatus further comprises electric current detecting device in a power supply path from the electricity supply device to the load circuit, and the electric current detecting means judges in which of the first and second operating modes the load circuit is operated on the basis of electric current detecting results, and outputs an operating mode signal for notifying the operated operating mode of the load circuit. In accordance with such a construction, the operating mode of the load circuit can be reliably known so that control can be more reliably performed. Further, power can be stably supplied to the load circuit, and there is also an effect in that a load circuit except for the load circuit able to output the operating mode signal can be adopted.

Further, the electric current detecting device has electric current detecting values at two levels between a first consumed electric current value in the operation of the load circuit in the first operating mode and a second consumed electric current value in the operation of the load circuit in the second operating mode, and the electric current detecting device outputs a signal judged as a switching period of the first and second operating modes by the load circuit as the operating mode signal in a detecting period of the electric current value between the electric current detecting values at the two levels. In accordance with such a construction, in addition to the effects of the above construction, closer control can be performed, and power can be stably supplied to the load circuit.

Further, an electronic apparatus comprises electricity device for supplying first power; a first voltage converting circuit for outputting second power different in voltage from the first power on the basis of the first power; a second voltage converting circuit for outputting third power different in voltage from the first power on the basis of the second power; and a load circuit operated by fourth power based on the second power and the third power; wherein the first voltage converting circuit has high power supply ability in comparison with the second voltage converting circuit; the second voltage converting circuit has high conversion efficiency in comparison with the first voltage converting circuit at a supply time of low power; the load circuit has at least a first operating mode and a second operating mode having a variation of a consumed electric current smaller than that in the first operating mode; and the electronic apparatus has a period for generating the fourth power based on the second power in the first operating mode of the load circuit, and generating the fourth power based on only the third power by stopping an operation of the first voltage converting circuit in the second operating mode of the load circuit. In accordance with such a construction, it is possible to solve a reduction in utilization efficiency of the power of the electricity supply device 101 with respect to the load circuit as a problem in a small period of the consumed electric current of the load circuit 104.

DESCRIPTION OF THE PREFERRED EMBODIMENTS

The embodiment modes of the present invention will next be explained on the basis of the drawings.

Figure 1:
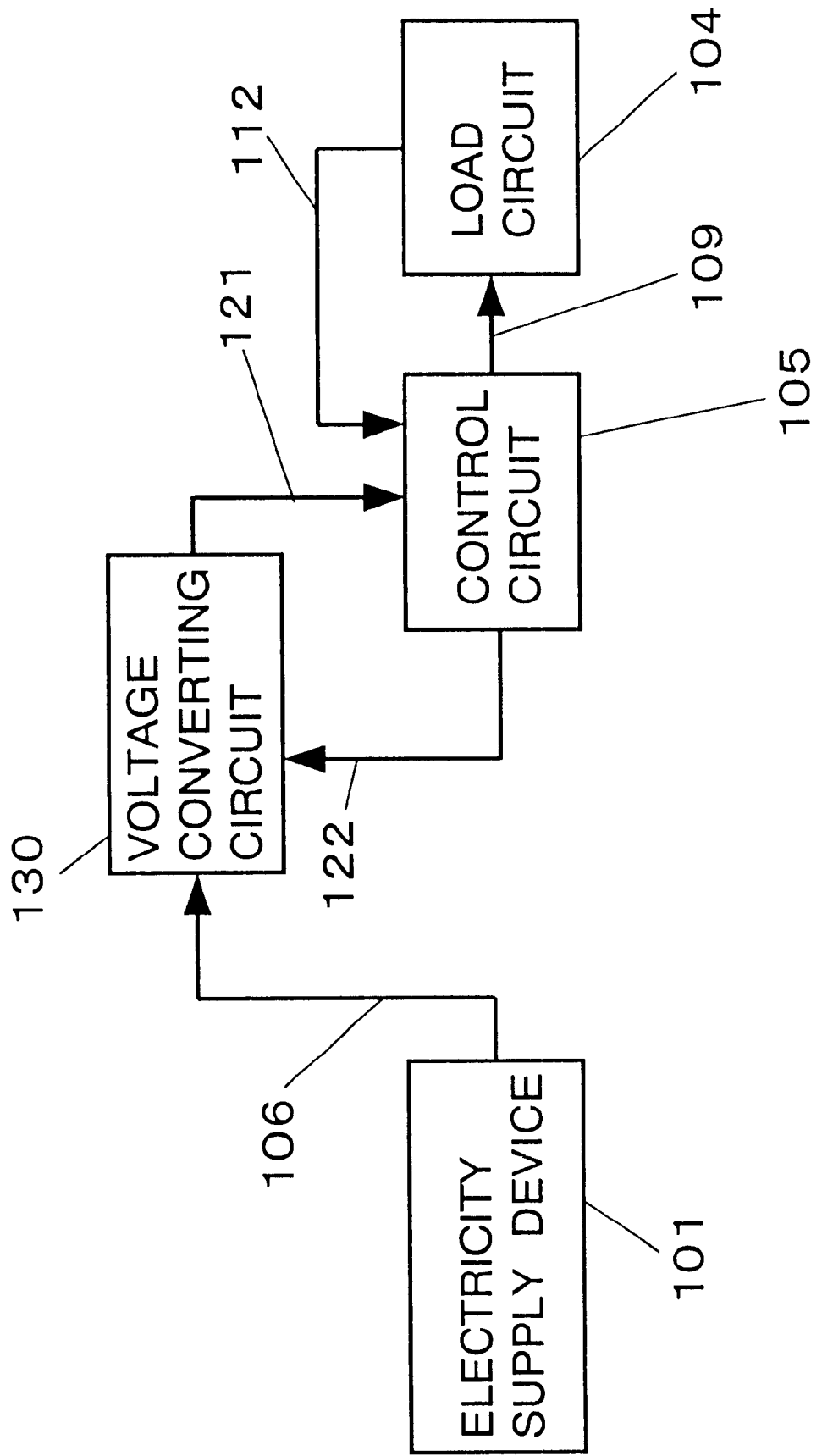
FIG. 1 is a block diagram of a schematic circuit of an electronic apparatus showing a first embodiment of the present invention.

FIG. 1 is a schematic block diagram of an electronic apparatus in a first embodiment of the invention. As shown in FIG. 1, the electronic apparatus in the invention has an electricity supply device 101 for supplying first power 106, a voltage converting circuit 130 for outputting converted power 121 obtained by converting a voltage of the first power 106, a control circuit 105 and a load circuit 104. The control circuit 105 outputs a control signal 122 for controlling an operation of the voltage converting circuit 130 and also outputs fourth power 109 on the basis of the inputted converted power 121. The load circuit 104 is operated by the fourth power 109. The load circuit 104 has at least first and second operating modes, and outputs an operating mode signal 112 for transmitting in which of the first and second operating modes the load circuit 104 is operated to the control circuit 105. The control circuit 105 has first and second output voltage control modes, and selects in which of the first and second output voltage control modes an output voltage of the voltage converting circuit 130 is controlled by the operating mode signal 112. Here, in the first output voltage control mode, a consumed electric current required for control is large, but a control speed is high. In the second output voltage control mode, the consumed electric current required for control is small, but the control speed is low. The first operating mode is an operating mode in which the consumed electric current is increased and is violently varied. The second operating mode is an operating mode in which the consumed electric current is reduced and is not almost varied.

When the above construction is used, the output voltage control mode of the control circuit 105 can be selected in accordance with the operating mode of the load circuit 104. Accordingly, when the load circuit 104 is set to the second operating mode, the control circuit 105 can efficiently utilize the first power 106 outputted from the electricity supply device 101 in the operation of the load circuit 104 by selecting the second output voltage control mode. Further, when the load circuit 104 is set to the first operating mode and switches the first and second operating modes, the fourth power 109 having a small voltage variation can be supplied to the load circuit 104 by selecting the first output voltage control mode.

The voltage converting circuit 130 may be a voltage converting circuit of a type using a transformer and a piezo element, a type using a coil, or a type using a capacitor. Further, if only the voltage is lowered, the voltage converting circuit 130 may be also a voltage lowering circuit of a series regulator type using a resistor and a MOSFET. If the load circuit 104 is a circuit of a consumed electric current such as an IC for a portable telephone, the voltage converting circuit of a switching regulator system using a coil is most suitable in compactness and high conversion efficiency. However, when power consumption of the load circuit 104 is low, the voltage converting circuit of a capacitor type is most suitable in further compactness and high converting efficiency. If the power consumption of the load circuit 104 is low and only the voltage is lowered, the voltage lowering circuit of a series regulator type using a resistor and a MOSFET is most suitable.

When the load circuit 104 is set to an IC for a portable telephone as an example, the consumed electric current tends to be increased and the variation of the consumed electric current tends to be violent at receiving and transmitting times in the first operating mode of the IC for a portable telephone. Accordingly, the control circuit 105 selects the first output voltage control mode. In this first output voltage control mode, a comparator circuit, an error amplifier, a bleeder resistor, etc. required in the control circuit 105 are preferably operated at high speeds in comparison with the second output voltage control mode. The consumed electric current is small and the variation of the consumed electric current is small at a waiting time in the second operating mode of the IC for a portable telephone. Accordingly, the control circuit 105 selects the second output voltage control mode. In this second output voltage control mode, the consumed electric current is preferably reduced instead of a high speed operation by reducing electric currents of the comparator circuit, the error amplifier, the bleeder resistor, etc. required in the control circuit 105, and performing an intermittent operation.

Further, the operating mode signal 112 from the load circuit 104 is preferably set to a signal for transmitting a change in the operating mode of the load circuit 104 before the operating mode is changed. The reasons for this are as follows. When no operating mode of the load circuit 104 can be known in advance and the control circuit 105 is operated in the second output voltage control mode and the operating mode of the load circuit 104 is changed to the first operating mode, it is impossible to cope with a load variation in this case so that the output voltage of the voltage converting circuit 130 is varied. Therefore, various problems of an error in the operation of the load circuit 104, and breakdown of the load circuit 104 in a serious case of the voltage variation are caused. Namely, a stable operation of the load circuit 104 can be performed by knowing the operating mode of the load circuit 104 in advance.

Figure 2:
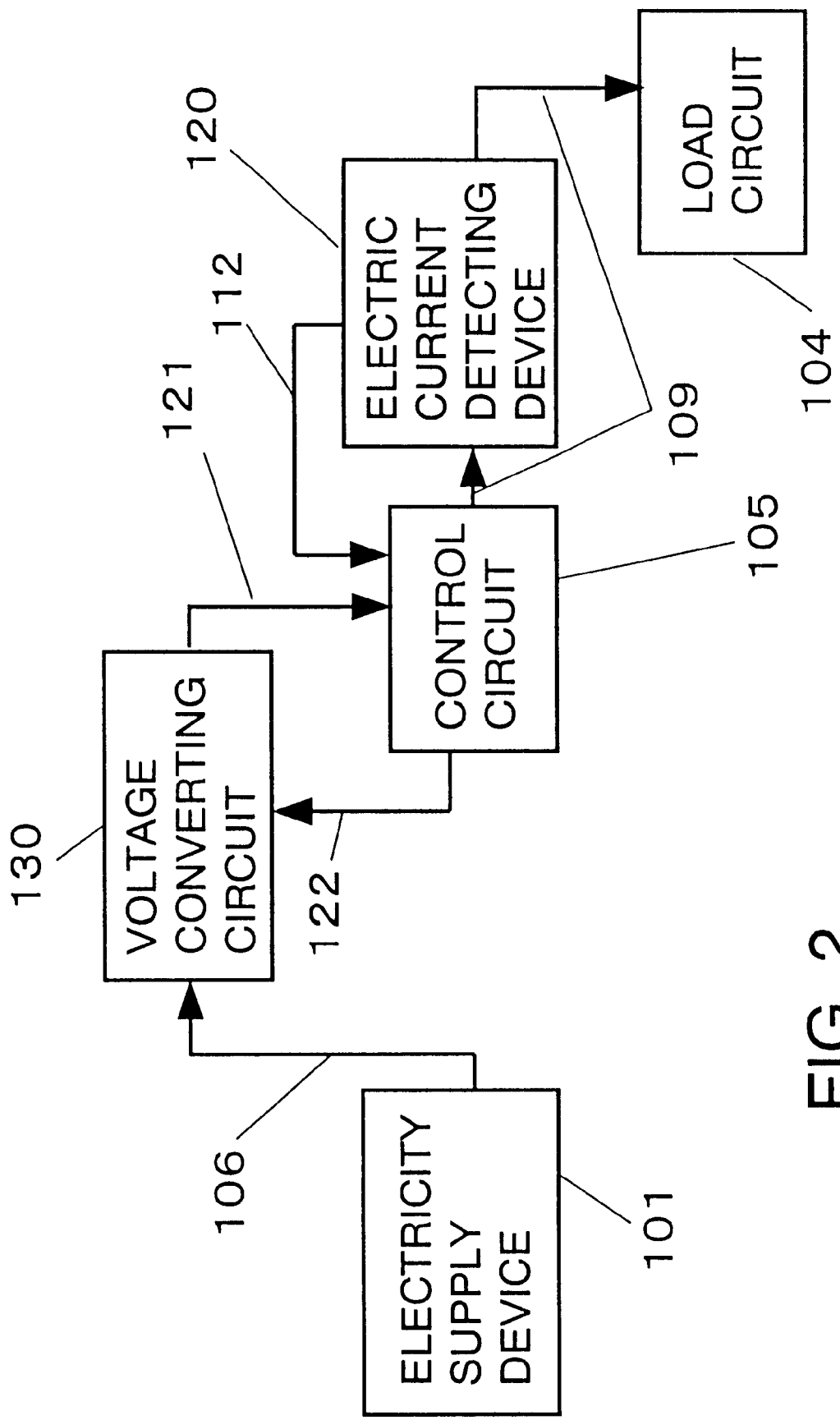
FIG. 2 is a block diagram of a schematic circuit of an electronic apparatus showing a second embodiment of the invention.

FIG. 2 is a schematic block diagram of an electronic apparatus in a second embodiment of the invention.

This embodiment differs from the first embodiment shown in FIG. 1 as follows. Namely, in the first embodiment, the operating mode signal 112 is outputted from the load circuit 104. However, in the second embodiment, the operating mode signal 112 is not outputted from the load circuit 104, but is outputted from an electric current detecting device 120 newly arranged from the control circuit 105 to a power supply path of the load circuit 104. The second embodiment has the same construction as the first embodiment with respect to the remaining portions. Namely, in the second embodiment shown in FIG. 2, the consumed electric current of the load circuit 104 is detected by the electric current detecting device 120 so that it is judged in which operating mode the load circuit 104 is operated. The operating mode signal 112 based on results of this judgment is outputted.

In accordance with the above construction, the load circuit 104 is limited to a circuit able to output the operating mode signal 112 in the first embodiment having the construction shown in FIG. 1, but it is also possible to cope with the situation by the load circuit 104 unable to output the operating mode signal 112 in the construction of the second embodiment shown in FIG. 2. However, since no operating mode of the load circuit 104 can be known in advance, there are possibilities of an error in the operation and breakdown of the load circuit 104 in switching of the operating mode of the load circuit 104 as mentioned above. Accordingly, the load circuit 104 adopts a type in which the consumed electric current in the switching of the operating mode is gradually increased or decreased. The electric current detecting device 120 detects two consumed electric current levels constructed by a first consumed electric current slightly smaller than the consumed electric current in the operation of the load circuit 104 in the first operating mode, and a second consumed electric current slightly greater than the consumed electric current in the operation of the load circuit 104 in the second operation mode. At this time, when the consumed electric current of the load circuit 104 is equal to or greater than the first consumed electric current, it is judged that the load circuit 104 is operated in the first operating mode. In contrast to this, when the consumed electric current of the load circuit 104 is smaller than the second consumed electric current, it is judged that the load circuit 104 is operated in the second operating mode. When the consumed electric current of the load circuit 104 is smaller than the first consumed electric current and is equal to or greater than the second consumed electric current, it is judged that the load circuit 104 is in an intermediate switching state of the operating mode, and the electric current detecting device 120 preferably outputs the operating mode signal 112 based on results of this judgment. The control circuit 105 can select an optimum control mode at an initial stage of the switching of the operating mode of the load circuit 104 by adopting such a construction. Accordingly, a driving voltage variation of the load circuit 104 can be prevented and an error in the operation and breakdown of the load circuit 104 can be prevented.

The electric current detecting device 120 may be any device if this device can detect an electric current amount. However, a device for arranging a resistor element and flowing a detecting electric current through the resistor element and detecting the electric current amount by the magnitude of a voltage generated at both ends of the resistor element is preferable since this device can be simplified in structure.

Figure 3:
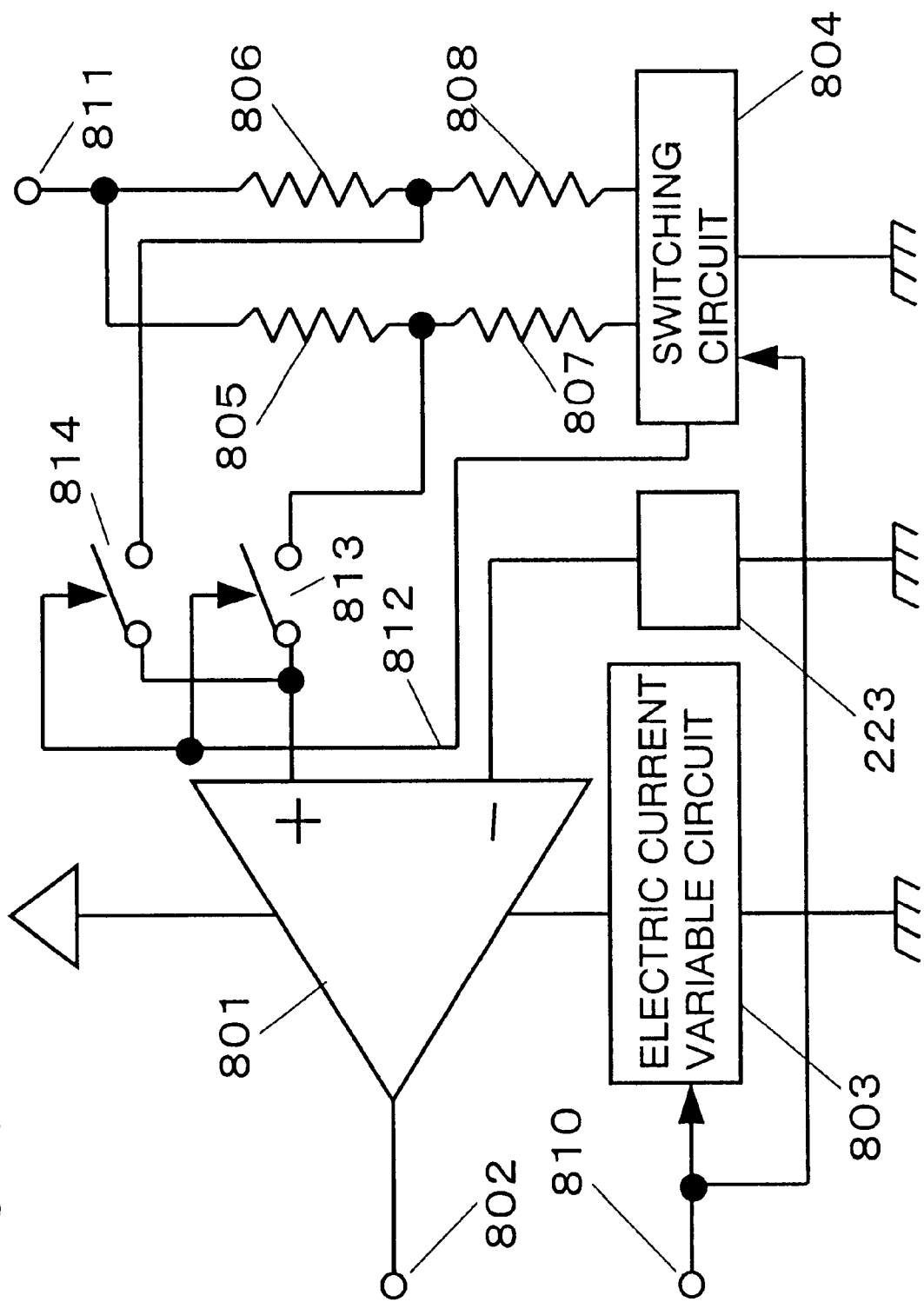
FIG. 3 is a diagram of a differential amplifying circuit and its peripheral circuit used in a control circuit 105 of the electronic apparatus in the invention.

FIG. 3 is a diagram of a differential amplifying circuit and its peripheral circuit used in the control circuit 105 shown in the first and second embodiments. The differential amplifying circuit and its peripheral circuit are constructed by a converted power input terminal 811, a first bleeder resistor, a second bleeder resistor, a first switch element 814, a second switch element 813, a differential amplifying circuit 801, an electric current variable circuit 803, a VREF circuit 223, a switching circuit 804, an amplifying signal output terminal 802 and an operating mode input terminal 810. Converted power 121 shown in the first and second embodiments is inputted to the converted power input terminal 811. The first bleeder resistor is constructed by resistors 806 and 808. The second bleeder resistor is constructed by resistors 805 and 807. The electric current variable circuit 803 adjusts a bias electric current of the differential amplifying circuit 801. The VREF circuit 223 generates a reference voltage. The switching circuit 804 controls electric current paths of the first and second bleeder resistors to a GND terminal. The amplifying signal output terminal 802 outputs an output signal of the differential amplifying circuit 801. The operating mode signal 112 shown in the first and second embodiments is inputted to the operating mode input terminal 810. The voltage of the converted power inputted from the converted power input terminal 811 is divided by the first or second bleeder resistor. The difference between the divided voltage and the reference voltage outputted from the VREF circuit 223 is amplified by the differential amplifying circuit 801 and is outputted to the amplifying signal output terminal 802.

The electric current variable circuit 803 is a circuit for switching the first and second output voltage control modes of the control circuit 105 described in the first and second embodiments. The first and second output voltage control modes are switched by switching the bias electric current of the differential amplifying circuit 801 in accordance with the operating mode signal inputted from the operating mode signal input terminal 810. The bias electric current is larger in the first output voltage control mode, and is smaller in the second output voltage control mode. Further, as the bias electric current is increased, the differential amplifying circuit 801 can be operated at a higher speed, but the consumed electric current is increased. Therefore, as described till now, control speed in the first output voltage control mode is improved in comparison with the second output voltage control mode, but the consumed electric current is increased.

Further, the electric current variable circuit 803 has a function for gradually varying the bias electric current. Thus, it is possible to restrain a reduction in precision of the differential amplifying circuit 801 as a problem as much as possible when the bias electric current is suddenly varied. This is because the voltage of the fourth power 109 shown in FIGS. 1 and 2 is varied when such a reduction in precision is caused. Namely, the electric current variable circuit 803 can switch the first and second output voltage control modes while the electric current variable circuit 803 sets the voltage variation of the fourth power 109 within a predetermined desirable spec (small range) by gradually varying the bias electric current. A variable speed of the bias electric current can be increased and changed as a responsive speed of the differential amplifying circuit 801 is increased. However, it is sufficient to set a changing speed for approximately changing 1 $\mu$A in 1 msec.

Furthermore, the electric current variable circuit 803 also has a function for varying the variable speed of the bias electric current in accordance with the bias electric current. The variable speed of the bias electric current is controlled in a direction in which the variable speed of the bias electric current is increased as the bias electric current is increased. This control is performed to improve a precision restoring speed of the differential amplifying circuit 801 when the bias electric current of the differential amplifying circuit 801 is increased. Therefore, in this case, the above control is performed because the precision reduction can be restrained even when the variable speed of the bias electric current is increased.

Since the electric current variable circuit 803 has the above function, the electric current variable circuit 803 can rapidly switch the first and second output voltage control modes while the electric current variable circuit 803 sets the voltage variation of the fourth power 109 within the predetermined desirable speck. Accordingly, it is possible to reduce a time loss due to this switching time.

In contrast to this, the switching circuit 804 controls the electric current paths of the first and second bleeder resistors to the GND terminal in accordance with the operating mode signal inputted from the operating mode signal input terminal 810. The switching circuit 804 outputs a switching signal 812 for controlling turning-on and turning-off of the first switch element 814 and the second switch element 813. The first switch element 814 controls the supply of the voltage divided by the first bleeder resistor to the differential amplifying circuit 801. The second switch element 813 controls the supply of the voltage divided by the second bleeder resistor to the differential amplifying circuit 801.

Voltage dividing ratios of the first and second bleeder resistors are equal, and a resistance value of the resistor 806 constituting the first bleeder resistor is smaller than a resistance value of the resistor 805 constituting the second bleeder resistor. Accordingly, a follow-up property with respect to the voltage variation of the converted power input terminal 811 is preferable but the consumed electric current is large in characteristics of the voltage divided by the first bleeder resistor in comparison with the voltage divided by the second bleeder resistor. It is preferable to use the first bleeder resistor in the first output voltage control mode, and use the second bleeder resistor in the second output voltage control mode.

The switching circuit 804 also has a function for arranging an electric current path to the GND terminal in only one of the bleeder resistors after the electric current path to the GND terminal is arranged in both the bleeder resistors in the switching of the first and second bleeder resistors. Since such a function is provided, a value of the divided voltage inputted to the differential amplifying circuit 801 becomes indefinite in the switching of the bleeder resistors, and it is possible to prevent that no control circuit 105 shown in FIGS. 1 and 2 can control the voltage of the fourth power 109 shown in FIGS. 1 and 2.

The control circuit 105 can have the first and second output voltage control modes, and the voltage variation of the fourth power 109 caused in the switching of the first and second output voltage control modes can be restrained within a predetermined desirable speck by using the differential amplifying circuit and its peripheral circuit having the above construction and function in the control circuit 105 in each of the embodiments shown in FIGS. 1 and 2. Further, the switching speed is increased and a time loss due to this switching is reduced.

Figure 4:
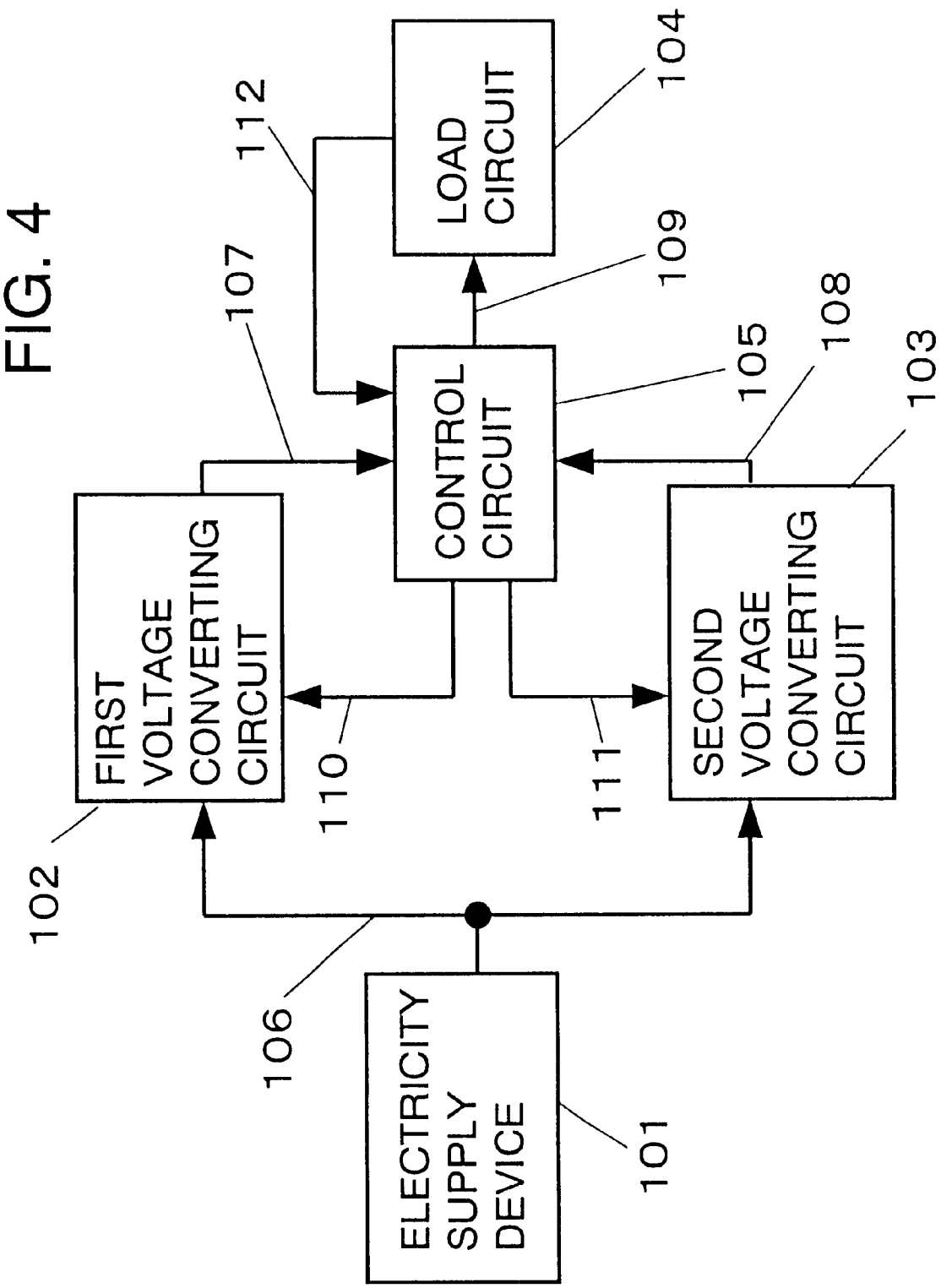
FIG. 4 is a block diagram of a schematic circuit of an electronic apparatus showing a third embodiment of the invention.

FIG. 4 is a schematic block diagram of an electronic apparatus in a third embodiment of the invention.

As shown in FIG. 4, the electronic apparatus in this embodiment has an electricity supply device 101 for supplying first power 106, a first voltage converting circuit 102 for outputting second power 107 obtained by converting a voltage of the first power 106, a second voltage converting circuit 103 for outputting third power 108 obtained by converting a voltage of the first power 106, a control circuit 105, and a load circuit 104. The control circuit 105 outputs a first control signal 110 for controlling an operation of the first voltage converting circuit 102 and a second control signal 111 for controlling an operation of the second voltage converting circuit 103, and also outputs fourth power 109 on the basis of the inputted second power 107 and the inputted third power 108. The load circuit 104 is operated by the fourth power 109. Further, the load circuit 104 has a first operating mode having large consumed power, and a second operating mode having consumed power smaller than that in the first operating mode. The load circuit 104 outputs an operating mode signal 112 for transmitting in which of the first and second operating modes the load circuit 104 is operated to the control circuit 105. Further, the control circuit 105 can control a first control signal 110 and a second control signal 111 in accordance with the operating mode signal 112.

In accordance with the above construction, an optimum method for the operating mode of the load circuit 104 can be selected from a method for converting the second power 107 to the fourth power 109, a method for converting the third power 108 to the fourth power 109, and a method for converting combined power of the second power 107 and the third power 108 to the fourth power 109. Accordingly, the first power 106 outputted from the electricity supply device 101 can be efficiently utilized to operate the load circuit 104.

The first voltage converting circuit 102 and the second voltage converting circuit 103 may be a voltage converting circuit having a type using a transformer and a piezo element, a type using a coil, and a type using a capacitor. Further, when only a voltage is lowered, the first voltage converting circuit 102 and the second voltage converting circuit 103 may be also a voltage lowering circuit of a series regulator type using a resistor and a MOSFET. When the load circuit 104 is a circuit of a consumed electric current such as an IC for a portable telephone, the voltage converting circuit of a switching regulator system using a coil is optimal in view of compactness and high conversion efficiency. Further, when the consumed power of the load circuit 104 is low, the voltage converting circuit of a capacitor type is optimal in view of further compactness and high conversion efficiency. Further, when the consumed power of the load circuit 104 is low and only a voltage is lowered, the voltage lowering circuit of a series regulator type using a resistor and a MOSFET is optimal.

When the difference in consumed power between the first and second operating modes of the load circuit 104 is large and the consumed power in the second operating mode is extremely small, it is preferable to adopt the voltage converting circuit of the switching regulator system using a coil in the first voltage converting circuit 102, and adopt the voltage converting circuit using a capacitor in the second voltage converting circuit 103. Further, when the consumed power in both the operating modes of the load circuit 104 is low and it is sufficient for the first voltage converting circuit 103 to have a function of only the voltage lowering, it is preferable to adopt the voltage converting circuit using a capacitor in the first voltage converting circuit 102, and adopt the voltage lowering circuit of the series regulator type using a resistor and a MOSFET in the second voltage converting circuit 103.

The operating mode signal 112 is preferably set to a signal for transmitting a change in the operating mode of the load circuit 104 before the operating mode is changed. This is because the operations of the first voltage converting circuit 102 and the second voltage converting circuit 103 are unstable for a while after starting of these operations so that no power can be outputted and no voltage of the outputted power is set to an object voltage. Namely, when the operating mode of the load circuit 104 is switched and a stopped voltage converting circuit is simultaneously operated and the load circuit 104 is operated, driving power of the load circuit 104 is insufficient. Therefore, there is a danger that the load circuit 104 is operated in error and is broken since the driving voltage of the load circuit 104 is too high. In particular, when the outputted power is small, the second voltage converting circuit having high power conversion efficiency is constructed such that output ability of the power is small. Therefore, when the operating mode of the load circuit 104 is changed to the second operating mode having large consumed power from a driving state of the load circuit 104 operated in the second operating mode having small consumed power by the power outputted from this second voltage converting circuit 103, no output power can be obtained from the first voltage converting circuit 102 for a while, and the load circuit 104 in the second operating mode is operated by only the output power from the second voltage converting circuit 103. Accordingly, the driving power of the load circuit 104 is insufficient during this time, and there is a high possibility that the load circuit 104 is operated in error.

Accordingly, the control circuit 105 knows the switching of the operating mode of the load circuit 104 in advance by the operating mode signal 112. The control circuit 105 operates a voltage converting circuit required to be operated in advance, and can set this voltage converting circuit to a stable operable state before the operating mode of the load circuit 104 is changed. Therefore, it is possible to prevent the driving power of the load circuit 104 from being insufficient and an excessive voltage from being applied to the load circuit 104 in the change in the operating mode of the load circuit 104 so that an error in the operation and breakdown of the load circuit 104 in this case can be prevented.

Figure 5:
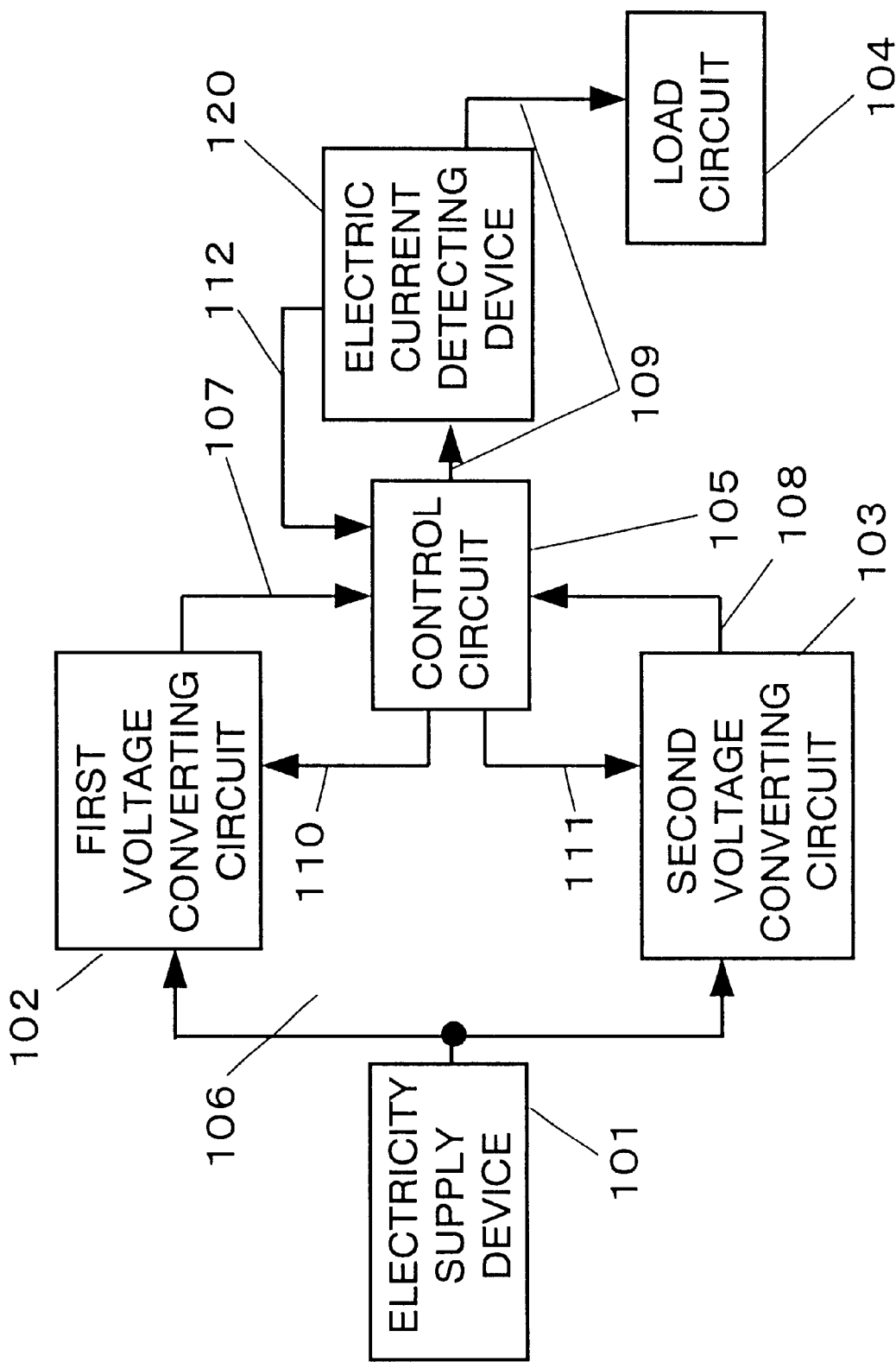
FIG. 5 is a block diagram of a schematic circuit of an electronic apparatus showing a fourth embodiment of the invention.

FIG. 5 is a schematic block diagram of an electronic apparatus in accordance with a fourth embodiment of the invention.

In the third embodiment, the operating mode signal 112 is outputted from the load circuit 104. However, in the fourth embodiment shown in FIG. 5, the operating mode signal 112 is not outputted from the load circuit 104, but is outputted from an electric current detecting means 120 newly arranged from the control circuit 105 to a power supply path of the load circuit 104. The fourth embodiment has the same construction as the third embodiment except for this construction. Namely, in the construction of the fourth embodiment, the electric current detecting device 120 judges in which operating mode the load circuit 104 is operated by detecting the consumed electric current of the load circuit 104, and outputs the operating mode signal 112 based on results of this judgment.

In accordance with the above construction, it is possible to cope with the situation by the load circuit 104 unable to output the operating mode signal 112 in the fourth embodiment although the load circuit 104 is limited to a circuit able to output the operating mode signal 112 in the construction of the third embodiment. However, since no operating mode of the load circuit 104 can be known in advance, there are possibilities of an error in the operation and breakdown of the load circuit 104 in the switching of the operating mode of the load circuit 104 as mentioned above. Accordingly, a type for gradually increasing or decreasing the consumed electric current in the switching of the operating mode is adopted in the load circuit 104. Further, two consumed electric current levels constructed by a first consumed electric current slightly smaller than the consumed electric current in the operation of the load circuit 104 in the first operating mode, and a second consumed electric current slightly greater than the consumed electric current in the operation of the load circuit 104 in the second operating mode are detected. When the consumed electric current of the load circuit 104 is equal to or greater than the first consumed electric current, it is judged that the load circuit 104 is operated in the first operating mode. In contrast to this, when the consumed electric current of the load circuit 104 is smaller than the second consumed electric current, it is judged that the load circuit 104 is operated in the second operating mode. When the consumed electric current of the load circuit 104 is smaller than the first consumed electric current and is equal to or greater than the second consumed electric current, it is judged that the load circuit 104 is in an intermediate switching state of the operating mode. The electric current detecting device 120 outputs the operating mode signal 112 based on results of this judgment. It is possible to start the operation of the stopped voltage converting circuit and stabilize this operation at an initial stage of the switching of the operating mode of the load circuit 104 by adopting such a construction. Further, the operated voltage converting circuit can be stopped at a final stage of the switching of the operating mode of the load circuit 104. Therefore, a driving voltage variation of the load circuit 104 in the change in the operating mode of the load circuit 104 can be prevented, and an error in the operation and breakdown of the load circuit 104 can be prevented.

The electric current detecting device 120 may be any means if this means can detect an electric current amount. However, a device for arranging a resistor element and flowing a detected electric current through the resistor element and detecting the electric current amount by the magnitude of a voltage generated at both ends of the resistor element is preferable since this means can be simplified in structure.

Figure 6:
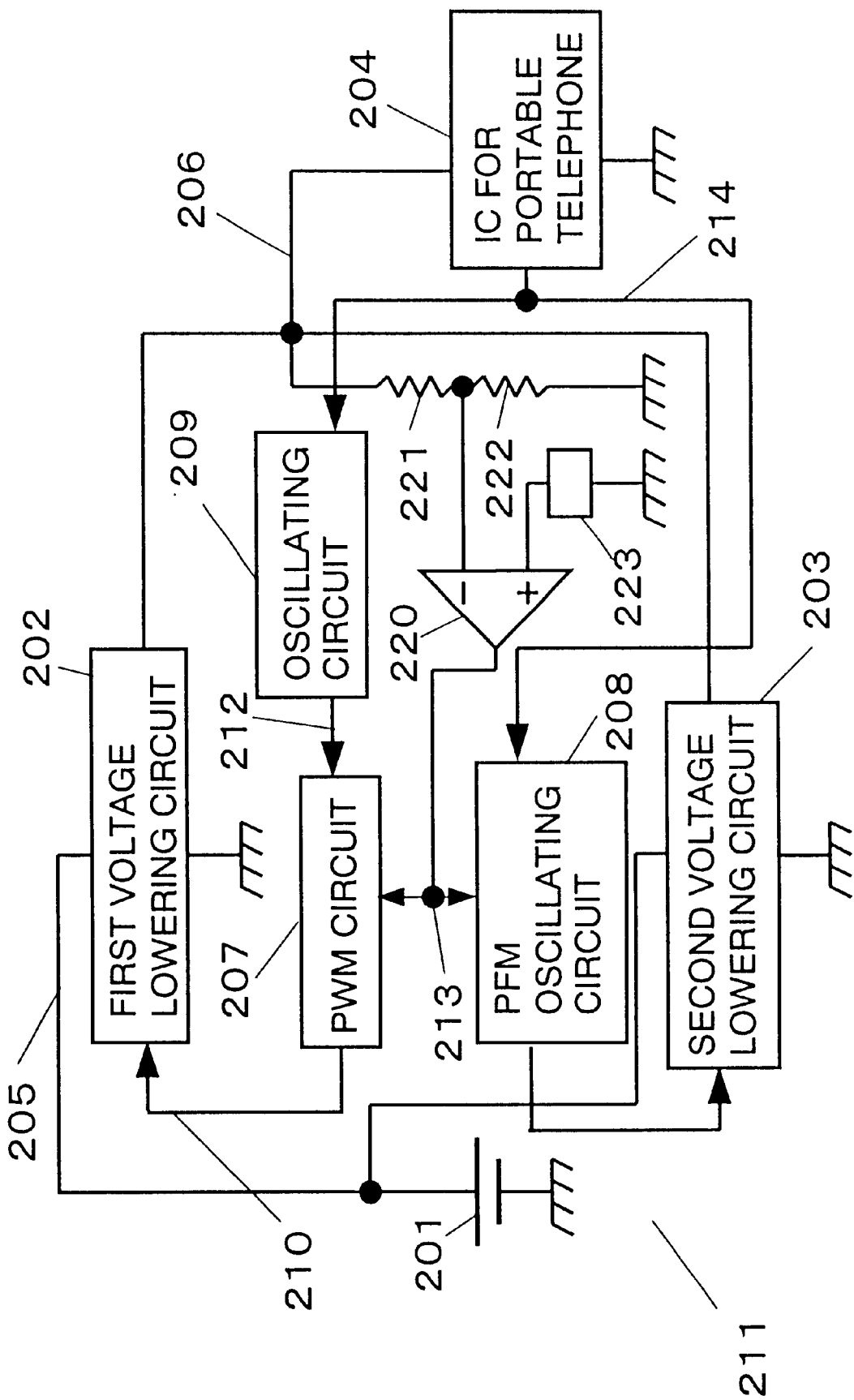
FIG. 6 is a circuit block diagram showing a concrete construction of the electronic apparatus in the third embodiment of the invention.

FIG. 6 is a block diagram showing a concrete circuit of the electronic apparatus in the third embodiment of the invention.

As shown in FIG. 6, the electronic apparatus has a battery 201 as an electricity supply device, a first voltage lowering circuit 202 as a first voltage converting circuit, a second voltage lowering circuit 203 as a second voltage converting circuit, a PWM circuit 207 constituting a control circuit, an oscillating circuit 209, a PFM oscillating circuit 208, an error amplifier circuit 220, a bleeder resistor constructed by a first resistor 221 and a second resistor 222, and a VREF circuit 223.

The operations of main constructional circuits will first be explained. The first voltage lowering circuit 202 lowers the voltage of battery power 205 by switching an internal MOSFET using a first pulse signal 210 as a first control signal, and outputs voltage lowering power 206 having a voltage lower than that of the battery power 205. The second voltage lowering circuit 203 lowers the voltage of the battery power 205 by switching an internal MOSFET using a second pulse signal 211 as a second control signal. Similar to the first voltage lowering circuit 202, the second voltage lowering circuit 203 outputs voltage lowering power 206 having a voltage lower than that of the battery power 205. An IC 204 for a portable telephone is operated by the voltage lowering power 206 outputted from the first voltage lowering circuit 202 or the second voltage lowering circuit 203, and outputs an operating mode signal 214 for transmitting whether the operating mode of the IC 204 is a receiving-transmitting mode or a waiting mode.

The operations of the respective circuits constituting the control circuit will next be explained. The voltage of the voltage lowering power 206 is divided by the first resistor 221 and the second resistor 222, and this divided voltage is outputted to a minus input terminal of the error amplifier circuit 220. The VREF circuit 223 generates a reference voltage, and outputs this reference voltage to a plus input terminal of the error amplifier circuit 220. The error amplifier circuit 220 amplifies the difference between the divided voltage inputted to the minus input terminal and the reference voltage inputted to the plus input terminal, and outputs results of this amplification as an error signal 213. The oscillating circuit 209 outputs a clock signal 212, and performs control as to whether or not the oscillating circuit 209 outputs the clock signal 212 on the basis of an inputted operating mode signal 214. The PWM circuit changes duty of the inputted clock signal 212 on the basis of the error signal 213 similarly inputted, and outputs the clock signal 212 of this changed duty as a first pulse signal 210. Further, the PFM oscillating circuit 208 generates a clock signal of a frequency based on the inputted error signal 213, and outputs this clock signal as a second pulse signal 211, and performs control as to whether or not the PFM oscillating circuit 208 outputs the second pulse signal 211 on the basis of the inputted operating mode signal 214. When no oscillating circuit 209 outputs the clock signal 212 on the basis of the operating mode signal 214, no first pulse signal 210 is also outputted from the PWM circuit 207 so that the operation of the first voltage lowering circuit 202 is stopped. Accordingly, no voltage lowering power 206 is outputted from the first voltage lowering circuit 202. Further, when no PFM oscillating circuit 208 outputs the second pulse signal 211 on the basis of the operating mode signal 214, the operation of the second voltage lowering circuit 203 is stopped so that no voltage lowering power 206 is outputted from the second voltage lowering circuit 203.

The following operations can be performed by performing the above operation by each circuit of the above construction.

First, even when the consumed electric current of the IC 204 for a portable telephone is varied, the voltage of voltage lowering power 206 outputted from the first voltage lowering circuit 202 or the second voltage lowering circuit 203 can be controlled such that a voltage obtained by dividing the voltage of the voltage lowering power 206 by the first resistor 221 and the second resistor 222 is equal to a reference voltage generated by the VREF circuit 233. Namely, the voltage of the voltage lowering power 206 can be approximately set to be constant. Accordingly, the IC 204 for a portable telephone can be stably operated by the voltage lowering power 206 held approximately at a constant voltage.

Next, even when the operating mode of the IC 204 for a portable telephone is changed and the consumed electric current of the IC 204 for a portable telephone is extremely varied, a method able to most efficiently utilize the battery power 201 to operate the IC 204 for a portable telephone can be selected from a method for operating the IC 204 for a portable telephone by the voltage lowering power 206 outputted from the first voltage lowering circuit 202, a method for operating the IC 204 for a portable telephone by the voltage lowering power 206 outputted from the second voltage lowering circuit 203, and a method for operating the IC 204 for a portable telephone by the voltage lowering power 206 outputted from both the first voltage lowering circuit 202 and the second voltage lowering circuit 203. Accordingly, the battery power 201 can be efficiently utilized to operate the IC 204 for a portable telephone so that the portable telephone adopting the construction of this embodiment can be operated for a long time.

Figure 7:
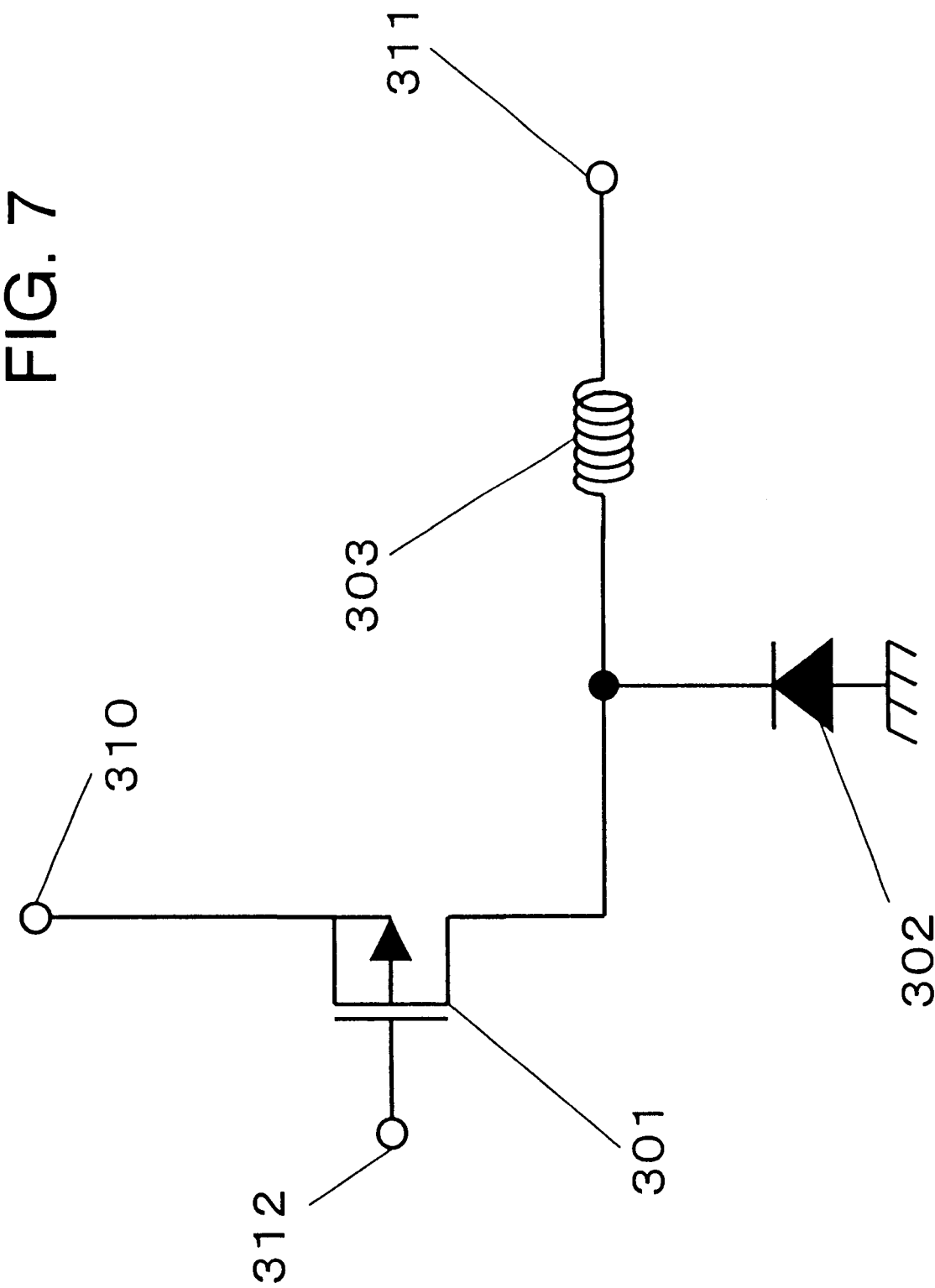
FIG. 7 is a circuit diagram showing a first voltage lowering circuit shown in FIG. 6.

FIG. 7 is a diagram of the first voltage lowering circuit 202 shown in FIG. 6.

As shown in FIG. 7, the first voltage lowering circuit 202 is a voltage lowering circuit of a switching regulator type using a coil 303. The voltage lowering circuit of this type is of a type of high power conversion efficiency when power lowered in voltage is relatively large. Accordingly, this type is suitable for supply of the voltage lowering power 206 when the IC 204 for a portable telephone shown in FIG. 6 is operated in a transmitting-receiving mode and relatively large voltage lowering power is required.

As shown in FIG. 7, the first voltage lowering circuit 202 has a P-type MOSFET 301, a diode 302, a coil 303, a battery power input terminal 310 for inputting the battery power 205 shown in FIG. 6 thereto, a pulse signal input terminal 312 for inputting a first pulse signal 210 thereto, and a voltage lowering power output terminal 311 for outputting the voltage lowering power 206. A source electrode and a base electrode of the P-type MOSFET 301 are connected to the battery power input terminal, and a gate electrode of the P-type MOSFET 301 is connected to the pulse signal input terminal 312. A drain electrode of the P-type MOSFET 301 is connected to a first electrode of the coil 303 and a first electrode of the diode 302. A second electrode of the diode 302 is connected to a GND terminal. A second electrode of the coil 303 is connected to the voltage lowering power output terminal 311. A forward direction of the diode 302 is set to a direction from the second electrode of the diode 302 to its first electrode.

In accordance with the above construction, the P-type MOSFET 301 is switched by the first pulse signal inputted to the pulse signal input terminal 312 so that the voltage of the battery power inputted to the battery power input terminal 310 is lowered and this battery power lowered in voltage can be outputted from the voltage lowering power output terminal 311 as voltage lowering power.

The diode 302 may be any diode if this diode has a rectifying action. However, in this embodiment, a diode able to obtain the rectifying action by a simple circuit construction is adopted. Further, the diode of a Schottky type having a small forward drop voltage may be also adopted to reduce power loss due to the forward drop voltage of the diode as much as possible.

Figure 8:
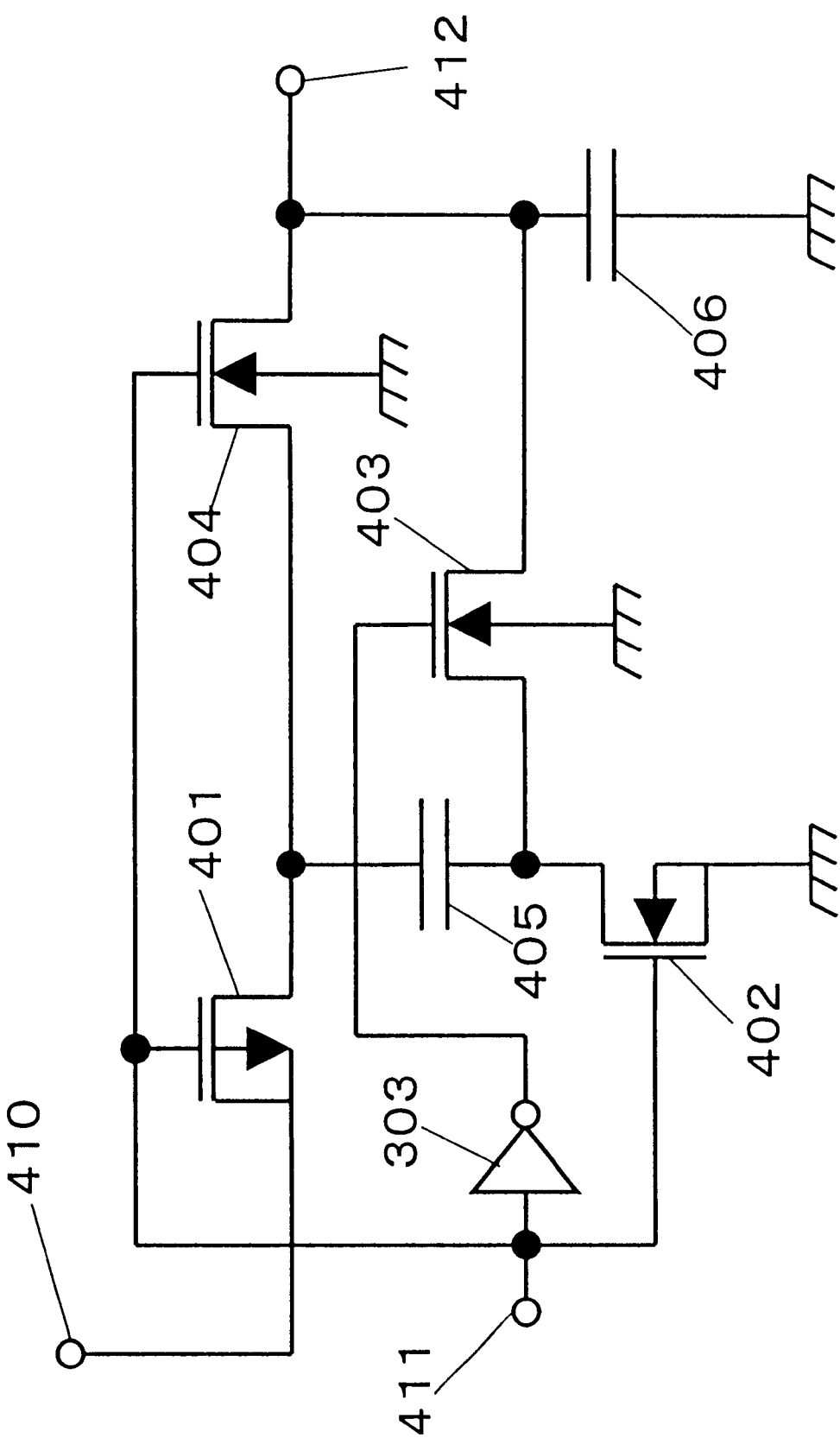
FIG. 8 is a circuit diagram showing a second voltage lowering circuit shown in FIG. 6.

FIG. 8 shows a diagram of the second voltage lowering circuit 203 shown in FIG. 6. This second voltage lowering circuit is a voltage lowering circuit of a type using a capacitor. The voltage lowering circuit of this type is of a type of high power conversion efficiency when very small voltage lowering power is supplied. Accordingly, it is suitable for the supply of the voltage lowering power 206 when the IC 204 for a portable telephone shown in FIG. 6 is operated in a waiting mode and only very small consumed power is required.

As shown in FIG. 8, the voltage lowering circuit of this construction has a P-type MOSFET 401, a first N-type MOSFET 402, a second N-type MOSFET 403, a third N-type MOSFET 404, a first capacitor 405, a second capacitor 406 and an inverter circuit 303. Further, a battery power input terminal 410 for inputting the battery power 205 shown in FIG. 6 thereto, a pulse signal input terminal 411 for inputting the second pulse signal 211 thereto, and a voltage lowering power output terminal 412 for outputting the voltage lowering power 206 are arranged. Further, the pulse signal input terminal 411 is connected to gate electrodes of the P-type MOSFET 401, the first N-type MOSFET 402 and the third N-type MOSFET 404, and is also connected to an input electrode of an inverter circuit 407. An output electrode of the inverter circuit 407 is connected to a gate electrode of the second N-type MOSFET 403. A source electrode and a base electrode of the P-type MOSFET 401 are connected to the battery power input terminal, and a drain electrode of the P-type MOSFET 401 is connected to a first electrode of a first capacitor 405 and a drain electrode of the third N-type MOSFET 404. A source electrode and a base electrode of the first N-type MOSFET 402 are connected to a GND terminal, and a drain electrode of the first N-type MOSFET 402 is connected to a second electrode of the first capacitor 405 and a drain electrode of the second N-type MOSFET 403. A source electrode of the second N-type MOSFET 403 is connected to a first electrode of a second capacitor 406, and second electrodes of the first capacitor 405 and the second capacitor 406 are connected to the GND terminal.

In accordance with the above construction, each MOSFET is switched by a second pulse signal inputted from the pulse signal input terminal 411 so that a connecting state of each capacitor is switched. Thus, the voltage of the battery power inputted to the battery power input terminal 410 is lowered, and this battery power lowered in voltage can be outputted from the voltage lowering power output terminal 412 as voltage lowering power.

The second capacitor 406 also has a function for smoothing power source of the IC 204 for a portable telephone shown in FIG. 6.

As mentioned above, in this embodiment, the construction shown in FIG. 6 is adopted. The first voltage lowering circuit 202 shown in FIG. 6 adopts a voltage lowering circuit of a switching regulator type using a coil as a type in which power conversion efficiency is increased when relatively large voltage lowering power as shown in FIG. 7 is outputted. The second voltage lowering circuit 203 shown in FIG. 6 adopts a voltage lowering circuit of a type using a capacitor as a type in which power conversion efficiency is increased when very small voltage lowering power as shown in FIG. 8 is outputted. Accordingly, the IC for a portable telephone can be mainly operated by the voltage lowering power from the first voltage lowering circuit in a transmitting-receiving mode of large consumed power of the IC for a portable telephone. The IC for a portable telephone can be mainly operated by the voltage lowering power from the second voltage lowering circuit in a waiting mode of very small consumed power of the IC for a portable telephone. Accordingly, in comparison with a case in which the IC for a portable telephone is operated by the voltage lowering power of one voltage lowering circuit in the conventional construction, power conversion efficiency of the voltage lowering circuit is improved and the IC for a portable telephone can be efficiently operated by battery power. Therefore, the portable telephone adopting the construction of this embodiment can be operated for a long time.

Further, in this embodiment, as shown in FIG. 6, the operating mode signal 214 outputted from the IC 204 for a portable telephone is constructed by a signal for notifying in which of the transmitting-receiving mode and the waiting mode the IC 204 for a portable telephone is operated in advance, and a signal for notifying the operating mode in real time. In accordance with this construction, when the operating mode of the IC 204 for a portable telephone is changed to the transmitting-receiving mode from the waiting mode for performing the operation by the voltage lowering power of the second voltage lowering circuit 203, the first voltage lowering circuit 202 can be operated in advance by the operating mode signal 214, and the operating mode can be set to the transmitting-receiving mode after the operation of the first voltage lowering circuit 202 is stabilized. Then, the operation of the second voltage lowering circuit 203 can be stopped. Conversely, when the operating mode of the IC 204 for a portable telephone is changed to the waiting mode from the transmitting-receiving mode for performing the operation by the voltage lowering power of the first voltage lowering circuit 202, the operating mode can be set to the waiting mode after the operation of the second voltage lowering circuit 202 is stabilized by operating the second voltage lowering circuit 202 in advance. Then, the operation of the first voltage lowering circuit 202 can be stopped.

Accordingly, the operating mode of the IC 204 for a portable telephone can be switched at any time after the operation of a required voltage lowering circuit is stabilized. Therefore, a driving voltage of the IC 204 for a portable telephone is stabilized.

However, when the operating mode of the IC 204 for a portable telephone is changed in the above construction, the driving voltage of the IC for a portable telephone is inevitably slightly varied. This is because an operating speed of the error amplifier circuit 220 is reduced to prevent an oscillating phenomenon as a phenomenon in which the voltages of the voltage lowering power outputted from both the voltage lowering circuits are periodically varied. Accordingly, at a changing time of the operating mode at which the consumed electric current of the IC 204 for a portable telephone is suddenly varied, voltage control of the voltage lowering power outputted from the voltage lowering circuits is inevitably delayed so that the driving voltage of the IC 204 for a portable telephone is varied. Therefore, to remove this variation of the driving voltage, the IC 204 for a portable telephone preferably adopts a type in which the consumed electric current is gradually changed in the change in the operating mode.

Figure 9:
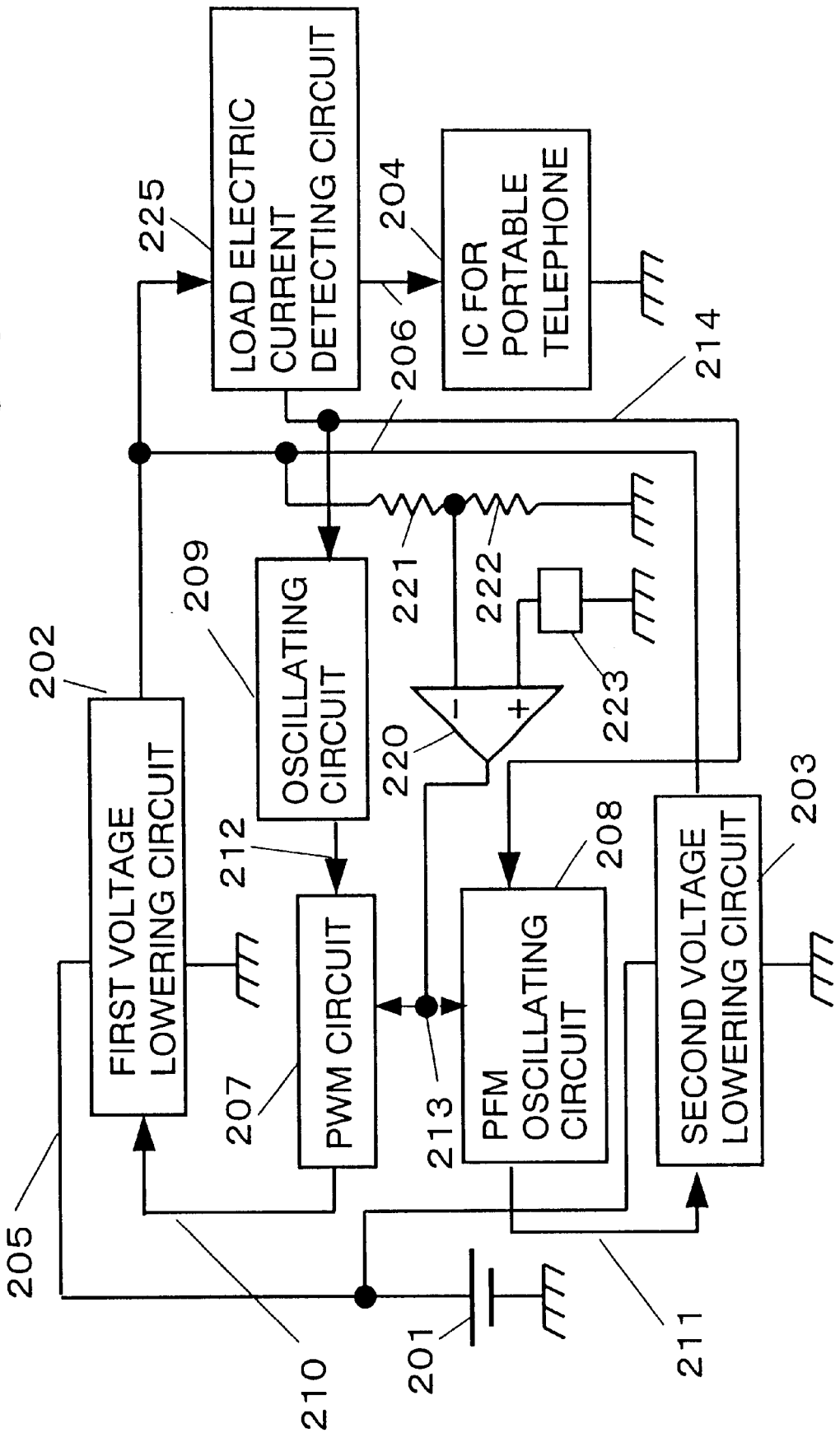
FIG. 9 is a circuit block diagram showing a concrete construction of the electronic apparatus in the fourth embodiment of the invention.

FIG. 9 is a diagram showing a concrete circuit block in an electronic apparatus in accordance with a fourth embodiment of the invention.

The circuit block diagram shown in FIG. 9 differs from the circuit block diagram shown in FIG. 6 in the following points. Namely, in the circuit block diagram shown in FIG. 6, the operating mode signal 214 is outputted from the IC 204 for a portable telephone. However, in the circuit block diagram shown in FIG. 9, the operating mode signal 214 is not outputted from the IC 204 for a portable telephone, but is outputted from a load electric current detecting circuit 225 arranged between a plus side power source input terminal of the IC 204 for a portable telephone and a voltage lowering power output terminal of a first voltage lowering circuit 202 or a second voltage lowering circuit 203. The other constructions of the circuit block diagram shown in FIG. 9 are the same as the circuit block diagram shown in FIG. 6. Namely, it is judged whether the IC 204 for a portable telephone is set to the transmitting-receiving mode or the waiting mode by detecting the consumed electric current of the IC 204 for a portable telephone by this load electric current detecting circuit 225. Results of this judgment are outputted as the operating mode signal 214.

In accordance with the above construction, the driving power of the IC 204 for a portable telephone can be selected from the voltage lowering power outputted from the first voltage lowering circuit 202, the voltage lowering power outputted from the second voltage lowering circuit 203, and the voltage lowering power outputted from both the voltage lowering circuits in accordance with the operating mode of the IC 204 for a portable telephone even when the IC 204 for a portable telephone has no function able to output the operating mode signal 214.

However, the above contents can be executed, but no change in the operating mode of the IC 204 for a portable telephone can be known in advance although this change can be known in the first embodiment. Therefore, the IC 204 for a portable telephone adopts a construction in which the consumed electric current is gradually increased or decreased in the change in the operating mode. Further, the load electric current detecting circuit 225 has two levels constructed by first and second detecting levels with respect to a detecting level of the consumed electric current of the IC 204 for a portable telephone. At the first detecting level, the consumed electric current of the IC 204 for a portable telephone is slightly smaller than the consumed electric current in the operation of the IC 204 for a portable telephone in the transmitting-receiving mode. At the second detecting level, the consumed electric current of the IC 204 for a portable telephone is slightly greater than the consumed electric current in the operation of the IC 204 for a portable telephone in the waiting mode. When the consumed electric current of the IC 204 for a portable telephone is equal to or greater than the first detecting level, it is judged that the IC 204 for a portable telephone is operated in the first operating mode. In contrast to this, when the consumed electric current of the IC 204 for a portable telephone is smaller than the second detecting level, it is judged that the IC 204 for a portable telephone is operated in the second operating mode. When the consumed electric current of the IC 204 for a portable telephone is smaller than the first detecting level and is equal to or greater than the second detecting level, it is judged that the IC 204 for a portable telephone is in a changing state of the operating mode. The operating mode signal 214 based on this judgment is outputted. Further, when the operating mode signal 214 transmits the changing state of the operating mode of the IC 204 for a portable telephone, both the voltage lowering circuits are operated by operating both the oscillating circuit 209 and the PFM oscillating circuit 208. In contrast to this, when the operating mode signal 214 transmits the operation of the IC 204 for a portable telephone in the first operating mode, only the first voltage lowering circuit 202 is operated by stopping only the PFM oscillating circuit 208. Further, when the operating mode signal 214 transmits the operation of the IC 204 for a portable telephone in the second operating mode, only the second voltage lowering circuit 203 is operated by stopping only the oscillating circuit 209.

In accordance with the above control construction, the operation of a required voltage lowering circuit is started at an initial changing stage of the operating mode of the IC 204 for a portable telephone. Therefore, the voltage lowering circuit already operated is stably operated at a stage at which the operating mode of the IC 204 for a portable telephone has been changed. Accordingly, the variation of the driving voltage of the IC 204 for a portable telephone can be prevented when the operating mode of the IC 204 for a portable telephone is changed. The driving voltage variation of the IC 204 for a portable telephone in the change in the operation mode of the IC 204 for a portable telephone can be also prevented by delaying the processing speed of the error amplifier circuit 220 as mentioned above.

Figure 10:
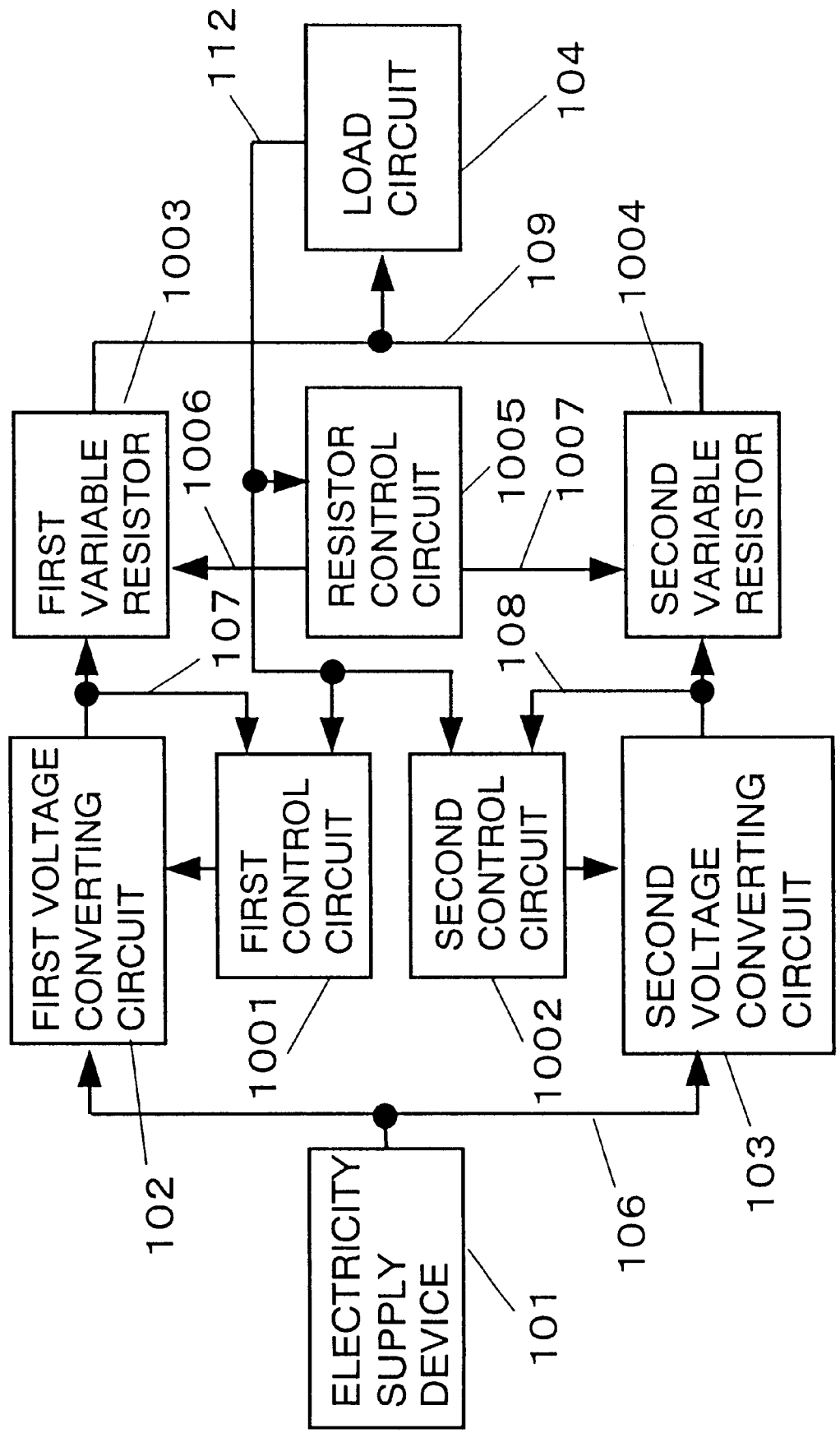
FIG. 10 is a block diagram of a schematic circuit of an electronic apparatus showing a fifth embodiment of the invention.

FIG. 10 is a schematic block diagram of an electronic apparatus in a fifth embodiment of the invention. An electricity supply device 101, a first voltage converting means 102, a second voltage converting means 103 and a load circuit 104 are constructed by using the same as the third embodiment. Namely, the electronic apparatus has the electricity supply device 101 for supplying first power 106, the first voltage converting circuit 102 for outputting second power 107 obtained by converting the voltage of the first power 106, and the second voltage converting circuit 103 for outputting third power 108 obtained by converting the voltage of the first power 106. Further, the electronic apparatus has a first control circuit 1001, a second control circuit 1002, a first variable resistor 1003, a second variable resistor 1004, a load circuit 104 operated by fourth power 109, and a resistor control circuit 1005. The first control circuit 1001 monitors the voltage of the second power 107, and controls an operation of the first voltage converting circuit 102 by a first control signal 110 such that this voltage becomes a predetermined desirable voltage. The second control circuit 1002 monitors the voltage of the third power 108, and controls an operation of the second voltage converting circuit 103 by a second control signal 111 such that this voltage becomes a predetermined desirable voltage. Each of the first control circuit 1001 and the second control circuit 1002 has the same basic construction and operation as the control circuit 105 described in the first to fourth embodiments.

The load circuit 104 has at least first and second operating modes, and outputs an operating mode signal 112 for notifying in which operating mode the load circuit 104 is operated. The resistor control circuit 1005 outputs a first resistor variable signal 1006 and a second resistor variable signal 1007 in accordance with the operating mode signal 112. The first variable resistor 1003 is arranged in a supply path for converting the second power 107 to the fourth power 109, and controls a supply amount of the second power 107 by varying a resistance value of this first variable resistor 1003 in accordance with the first resistor control signal 1006. The second variable resistor 1004 is arranged in a supply path for converting the third power 108 to the fourth power 109, and controls a supply amount of the third power 108 by varying a resistance value of this second variable resistor 1004 in accordance with the second resistor control signal 1007. Further, the first control circuit 1001 controls its own operation in accordance with the operating mode signal 112, and also controls an operation of the first voltage converting circuit 102 by the first control signal 110. The second control circuit 1002 controls its own operation in accordance with the operating mode signal 112, and also controls an operation of the second voltage converting circuit 103 by the second control signal 111.

In accordance with the above construction, similar to the third embodiment, a case for most efficiently utilizing the first power 106 to operate the load circuit 104 can be selected in accordance with the operating mode of the load circuit 104 from a case for converting the second power 107 to the fourth power 109, a case for converting the third power 108 to the fourth power, and a case for converting both the second power 107 and the third power 108 to the fourth power. Accordingly, the first power 106 can be efficiently utilized, and the load circuit 104 can be stably operated.

In this embodiment, the first operating mode of the load circuit 104 is an operating mode in which the consumed electric current is large or violently varied in comparison with the second operating mode. The first voltage converting circuit 102 is a voltage converting circuit in which output electric current ability is good but conversion efficiency is bad in the case of a low output electric current in comparison with the second voltage converting circuit 103. The first control circuit 1001 is a control circuit in which control speed is high but the consumed electric current is large in comparison with the second control circuit 1002.

Accordingly, when the load circuit 104 is set to the first operating mode and the operating mode is switched, the first control circuit 1001 is operated and the first voltage converting circuit 102 is operated, and resistance of the first variable resistor 1003 is set to be low. Simultaneously, the operation of the second control circuit 1002 is stopped, and the operation of the second voltage converting circuit 103 is stopped, and resistance of the second variable resistor 1004 is set to be high. Thus, only the second power 107 is preferably converted to the fourth power 109. The reasons for this are as follows. When only the third power 108 is converted to the fourth power 109 in the switching of the operating mode of the load circuit 104 and the operation of the load circuit 104 in the first operating mode and the consumed electric current of the load circuit 104 is increased, the supplied electric current of the third power 108 becomes insufficient so that the voltage of the fourth power 104 is reduced and no load circuit 104 can be operated. When the consumed electric current of the load circuit 104 is violently varied, it is not overtaken in control of the second control circuit 1002 so that the voltage of the fourth power 109 is violently varied. Therefore, the load circuit 104 is operated in error and is broken. Accordingly, it is necessary for the load circuit 104 to notify the switching of the operating mode to each circuit by the operating mode signal 112 before the operating mode is switched. Therefore, the load circuit 104 of the invention also has such a function.

When the load circuit 104 is set to the second operating mode, the second control circuit 1002 is operated and the second voltage converting circuit 103 is operated, and the resistance of the second variable resistor 1004 is set to be low. Simultaneously, the operation of the first control circuit 1001 is stopped and the operation of the first voltage converting circuit 102 is stopped, and the resistance of the first variable resistor 1003 is set to be high. Thus, only the third power 108 is preferably converted to the fourth power 109. The reasons for this are as follows. When only the second power 108 is converted to the fourth power 109 and the load circuit 104 can be stably operated, the first power 106 supplied by the electricity supply device 101 can be much more efficiently utilized to operate the load circuit 104 in comparison with a case in which the load circuit 104 is operated by converting only the second power 108 to the fourth power 109. Further, when the load circuit 104 is operated in the second operating mode, the consumed electric current of the load circuit 104 is small even when only the second power 108 is converted to the fourth power 109. Therefore, the load circuit 104 can be sufficiently operated by the supply power of the third power 108, or no consumed electric current of the load circuit 104 is almost varied so that it is sufficiently overtaken in control of the second control circuit 1002. Therefore, no voltage of the fourth power 109 is varied and the load circuit 104 can be stably operated.

When the first variable resistor 1003 is switched from high resistance to low resistance, the electronic apparatus has a function for operating the first voltage converting circuit 102 by operating the first control circuit 1001 in advance, and performing the switching after the voltage of the second power 107 attains a stable state. Similarly, when the second variable resistor 1004 is switched from high resistance to low resistance, the electronic apparatus has a function for operating the second voltage converting circuit 103 by operating the second control circuit 1002 in advance, and performing the switching after the voltage of the third power 108 attains a stable state. The reasons for this are as follows. The voltage of the second power 107 or the third power 108 is unstable when the first voltage converting circuit 102 begins to be operated by operating the first control circuit 1001, or the second voltage converting circuit 103 begins to be operated by operating the second control circuit 1002. When the first variable resistor 1003 or the second variable resistor 1004 is switched from high resistance to low resistance in this unstable state, the voltage of the fourth power 109 becomes unstable, and the load circuit 104 is operated in error.

Further, the first variable resistor 1003 and the second variable resistor 1004 are switched from high resistance to low resistance, or low resistance to high resistance by the first resistor variable signal 1006 or the second resistor variable signal 1007 from the resistor control circuit 1005. In this case, the electronic apparatus has a function for performing the switching by gradually changing a resistance value. The reasons for this are as follows. When the resistance value of the first variable resistor 1003 or the second variable resistor 1004 is suddenly switched, it is not overtaken in control of the first control circuit 1001 or the second control circuit 1002 by a sudden output electric current in this case so that the voltage of the second power 107 or the third power 108 is varied. As a result, the voltage of the fourth power 109 is varied so that the load circuit 104 is operated in error and is broken.

Figure 11:
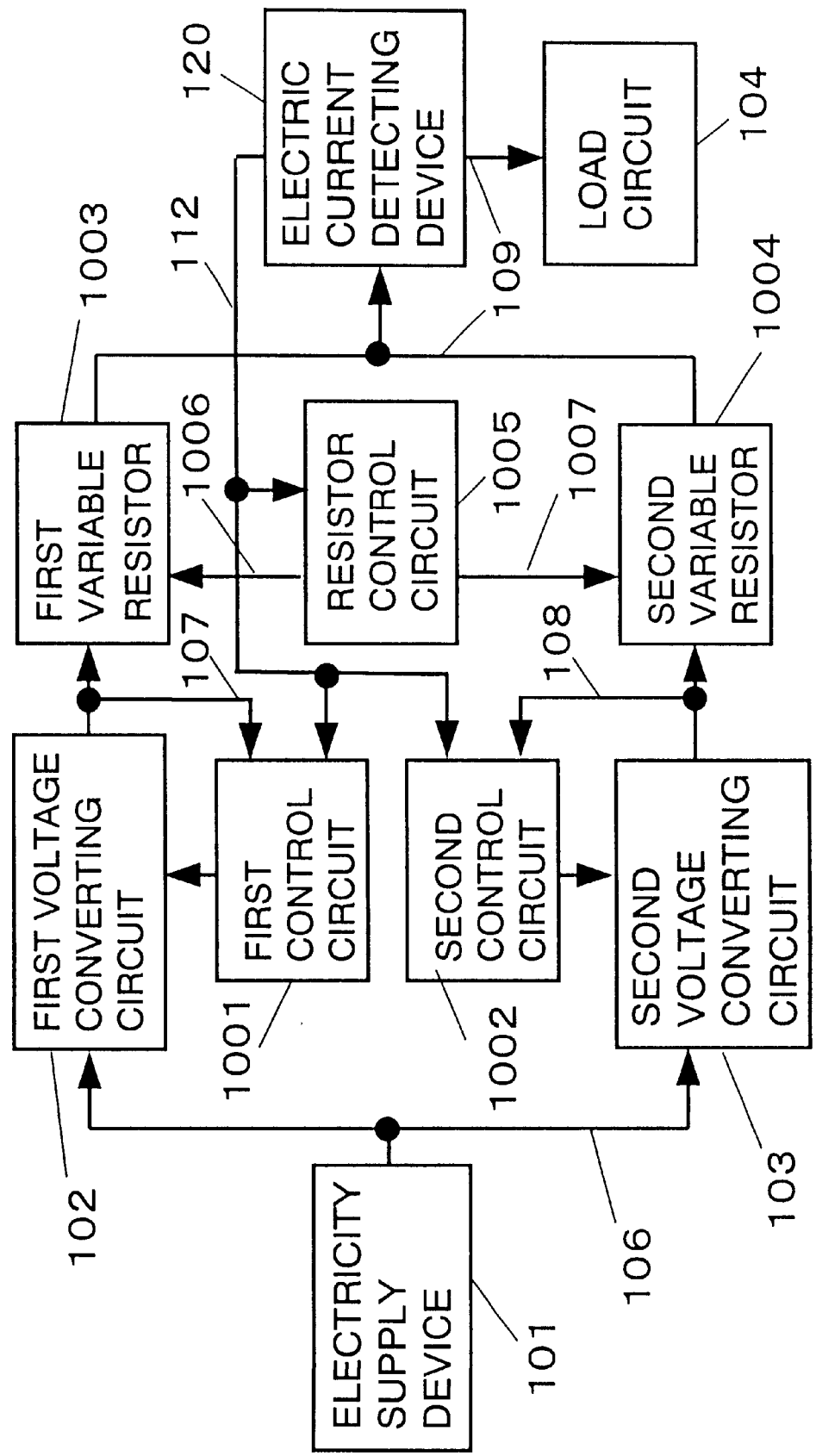
FIG. 11 is a block diagram of a schematic circuit of an electronic apparatus showing a sixth embodiment of the invention.
Figure 12:
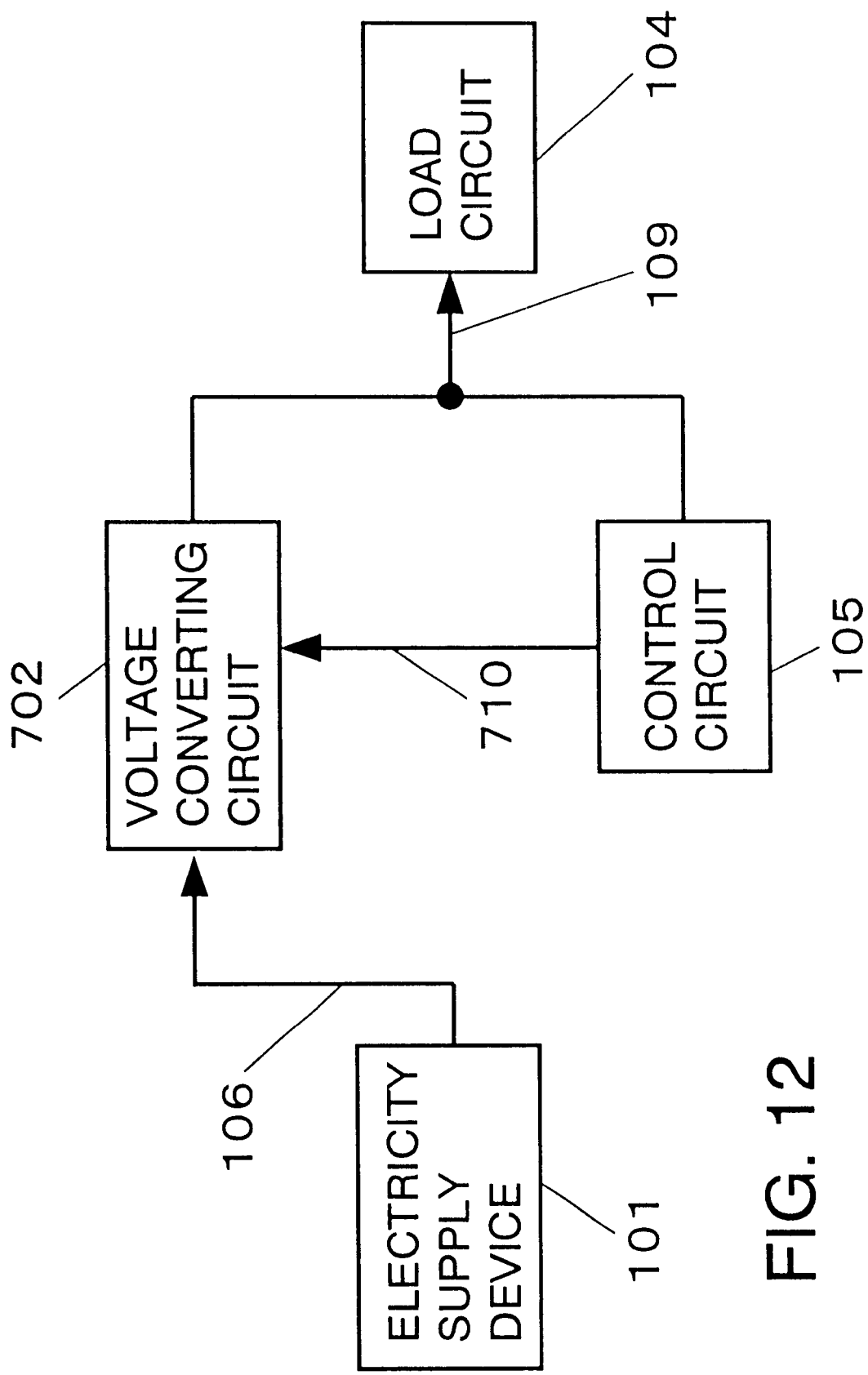
FIG. 12 is a block diagram of a schematic circuit showing an electronic apparatus having a conventional construction.

FIG. 11 is a schematic block diagram of an electronic apparatus in a sixth embodiment of the invention. An electricity supply device 101, a first voltage converting means 102, a second voltage converting means 103, a load circuit 104 and an electric current detecting means 120 are constructed by using the same as the fourth embodiment. In the fifth embodiment, the operating mode signal 112 is outputted from the load circuit 104. However, in the sixth embodiment shown in FIG. 11, the operating mode signal 112 is not outputted from the load circuit 104, but is outputted from the electric current detecting means 120 newly arranged between a control circuit 105 and a power supply path of the load circuit 104. The other constructions are similar to those in the fourth embodiment. Namely, in the fourth embodiment, it is judged in which operating mode the load circuit 104 is operated by detecting the consumed electric current of the load circuit 104 by the electric current detecting means 120. The operating mode signal 112 based on results of this judgment is outputted.

In the construction of the fifth embodiment, the load circuit 104 is limited to a circuit able to output the operating mode signal 112. However, in the sixth embodiment, it is possible to cope with the situation by the load circuit 104 unable to output the operating mode signal 112 by using the above construction. However, no operating mode of the load circuit 104 can be known in advance. Accordingly, as mentioned above, there are possibilities that the load circuit 104 is operated in error and is broken in the switching of the operating mode of the load circuit 104. Therefore, the load circuit 104 adopts a type for gradually increasing or decreasing the consumed electric current in the switching of the operating mode. The electric current detecting means 120 detects two consumed electric current levels of first and second consumed electric currents. The first consumed electric current is slightly smaller than the consumed electric current in the operation of the load circuit 104 in the first operating mode. The second consumed electric current is slightly greater than the consumed electric current in the operation of the load circuit 104 in the second operating mode. When the consumed electric current of the load circuit 104 is equal to or greater than the first consumed electric current, it is judged that the load circuit 104 is operated in the first operating mode. When the consumed electric current of the load circuit 104 is smaller than the second consumed electric current, it is judged that the load circuit 104 is operated in the second operating mode. When the consumed electric current of the load circuit 104 is smaller than the first consumed electric current and is equal to or greater than the second consumed electric current, it is judged that the load circuit 104 is in an intermediate switching state of the operating mode. The electric current detecting means 120 preferably outputs the operating mode signal 112 based on results of this judgment. The operation of each circuit described in the fifth embodiment can be performed by adopting such a construction so that a driving voltage variation of the load circuit 104 in the switching of the operating mode of the load circuit 104 can be prevented an error in the operation and breakdown of the load circuit can be prevented.

In accordance with the invention, the electronic apparatus is constructed by the electricity supply device for supplying power, the voltage converting circuit for outputting power obtained by converting a voltage of the power from the electricity supply device, and the load circuit operated by the power outputted from the voltage converting circuit and violently varied in the consumed electric current. In his electronic apparatus, the power from the electricity supply device can be efficiently utilized to operate the load circuit, and an error in the operation and breakdown of the load circuit can be prevented.

What is claimed is:

1. An electronic apparatus comprising:

an electricity supply device for supplying power;

a voltage converting circuit for converting the supplied power into a converted power having a different voltage from the supplied power, and outputting the converted power;

a control circuit for controlling the voltage converting circuit such that the converted power has a predetermined value; and a load circuit driven by the converted power;

wherein the control circuit has a first output voltage control mode and a second output voltage control mode, the second output voltage control mode having a consumed electric current smaller than that of the first output voltage control mode and a slower control speed than that of the first output voltage control mode;

the load circuit has a first operating mode and a second operating mode, the second operating mode having a consumed electric current smaller than that of the first operating mode; and the control circuit operates in the second output voltage control mode when the load circuit is in the second operating mode.

2. An electronic apparatus according to claim 1; wherein the load circuit outputs an operating mode signal for indicating in which of the first and second operating modes the load circuit is being operated.

3. An electronic apparatus according to claim 1; further comprising an electric current detecting device interposed in a path between the electricity supply device and the load circuit for judging in which of the first and second operating modes the load circuit is being operated on the basis of a detected electric current, and outputting an operating mode signal indicating the operating mode of the load circuit.

4. An electronic apparatus according to claim 3; wherein the electric current detecting device has electric current detecting values at two levels between a first consumed electric current value associated with operation of the load circuit in the first operating mode and a second consumed electric current value associated with operation of the load circuit in the second operating mode, and the electric current detecting device outputs as the operating mode signal a signal indicating that the load circuit is switching between the first and second operating modes when the detected electric current value is between the electric current detecting values at the two levels.

5. An electronic apparatus according to claim 1; wherein the voltage converting circuit comprises a first voltage converting circuit for converting the supplied power to a second power having a different voltage from the supplied power and outputting the second power, and a second voltage converting circuit for converting the supplied power to a third power having a different voltage from the supplied power, and outputting the third power; and wherein the load circuit is operated by a fourth power obtained by the second power and the third power, the first voltage converting circuit has a high power supply ability in comparison with the second voltage converting circuit, the second voltage converting circuit has a high conversion efficiency in comparison with the first voltage converting circuit at a supply time of low power, and the electronic apparatus generates the fourth power based on the second power in the first operating mode of the load circuit, and generates the fourth power based on only the third power by stopping the first voltage converting circuit in the second operating mode of the load circuit.

6. An electronic apparatus according to claim 1; wherein the control circuit operates in the first output voltage control mode when the load circuit is in the first operating mode.

7. An electronic apparatus according to claim 1; wherein the electricity supply device comprises a battery.

8. An electronic apparatus according to claim 1; wherein the voltage converting circuit selectively lowers the voltage of the supplied power.

9. An electronic apparatus according to claim 1; wherein the load circuit comprises a cellular telephone IC.

10. An electronic apparatus according to claim 9; wherein the operating mode signal output by the cellular telephone IC indicates whether the cellular telephone is in the first operating mode comprising a transmitting-receiving mode or the second operating mode comprising a waiting mode.

11. An electronic circuit comprising: a power source; a load having a first operating mode and a second operating mode which consumes less current and has a smaller current variation than the first operating mode; a voltage converting circuit connected to the power source; and a control circuit for controlling the voltage converting circuit to convert the voltage of the power source into a desired value, the control circuit having a first output voltage control mode and a second output voltage control mode which consumes less current and has a slower control speed than the first output voltage control mode, the control circuit being operated in the second output voltage control mode when the load is operated in the second operating mode.

12. An electronic circuit according to claim 11; wherein the control circuit operates in the first output voltage control mode when the load is in the first operating mode.

13. An electronic circuit according to claim 11; wherein the load outputs an operating mode signal for indicating in which of the first and second operating modes the load is being operated.

14. An electronic circuit according to claim 11; further comprising an electric current detecting device interposed between the power supply and the load for judging in which of the first and second operating modes the load is being operated based on a detected current value in the path.

15. An electronic circuit according to claim 14; wherein the electric current detecting device has electric current detecting values at two levels between a first consumed electric current value associated with operation of the load in the first operating mode and a second consumed electric current value associated with operation of the load in the second operating mode, and the electric current detecting device outputs as the operating mode signal a signal indicating that the load is switching between the first and second operating modes when the detected electric current value is between the electric current detecting values at the two levels.

16. An electronic circuit according to claim 11; wherein the voltage converting circuit comprises a first voltage converting circuit for converting the supplied power to a second power having a different voltage from the supplied power, and a second voltage converting circuit for converting the supplied power to a third power having a different voltage from the first power; and wherein the load is driven by a fourth power obtained from the second power and the third power, the first voltage converting circuit has a higher power supplying ability in comparison with the second voltage converting circuit and the second voltage converting circuit has a high conversion efficiency in comparison with the first voltage converting circuit at a supply time of low power, and the electronic apparatus generates the fourth power based on the second power in the first operating mode of the load and generates the fourth power based on only the third power by stopping the first voltage converting circuit in the second operating mode of the load.

17. An electronic circuit according to claim 11; wherein the power supply comprises a battery.

18. An electronic circuit according to claim 11; wherein the load comprises a cellular telephone IC.

19. An electronic apparatus according to claim 18; wherein the operating mode signal output by the cellular telephone IC indicates whether the cellular telephone is in the first operating mode comprising a transmitting-receiving mode or the second operating mode comprising a waiting mode.

* * * * *